US010257863B2

(12) United States Patent
Bergström et al.

(10) Patent No.: US 10,257,863 B2
(45) Date of Patent: Apr. 9, 2019

(54) HANDLING PHYSICAL RANDOM ACCESS CHANNEL TRANSMISSIONS IN MULTI-CARRIER SCENARIOS

(71) Applicant: Telefonaktiebolaget L M Ericsson (publ), Stockholm (SE)

(72) Inventors: Mattias Tan Bergström, Stockholm (SE); Yufei Blankenship, Kildeer, IL (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 405 days.

(21) Appl. No.: 14/890,393

(22) PCT Filed: Oct. 2, 2015

(86) PCT No.: PCT/SE2015/051041
§ 371 (c)(1),
(2) Date: Nov. 10, 2015

(87) PCT Pub. No.: WO2016/053179
PCT Pub. Date: Apr. 7, 2016

(65) Prior Publication Data
US 2016/0270121 A1 Sep. 15, 2016

Related U.S. Application Data

(60) Provisional application No. 62/059,438, filed on Oct. 3, 2014.

(51) Int. Cl.
*H04W 74/08* (2009.01)

(52) U.S. Cl.
CPC ............... *H04W 74/0833* (2013.01)

(58) Field of Classification Search
CPC ................................. H04W 74/0833
See application file for complete search history.

(56) References Cited

U.S. PATENT DOCUMENTS 8,427,971 B2 * 4/2013 Fischer ............. H04W 74/0866
370/230

2012/0302274 A1 * 11/2012 Ohta .................. H04W 72/042
455/509

(Continued)

FOREIGN PATENT DOCUMENTS

| WO | 2012154955 A1 | 11/2012 |
| WO | 2013127058 A1 | 9/2013 |
| WO | 2015139300 A1 | 9/2015 |

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.3.0, Sep. 2014, 1-57.

(Continued)

*Primary Examiner* — Brian D Nguyen
(74) *Attorney, Agent, or Firm* — Murphy, Bilak & Homiller, PLLC

(57) ABSTRACT

According to an aspect, a wireless terminal performs a method for a random access procedure in a wireless network. The method includes maintaining a preamble transmission attempt counter that tracks the number of random access preamble transmissions that are triggered and/or initiated in the random access procedure, including random access preamble transmissions that are aborted prior to completion of the transmission. The method also includes terminating the random access procedure in response to determining that the preamble transmission attempt counter indicates that a predetermined threshold number of transmission attempts have been made. Reports pertaining to failed preamble transmissions may be sent to the network, which then adjusts a configuration of the wireless terminal. The wireless terminal may also track time during an interval in which a preamble may be used in the random access procedure and terminate the random access procedure in response to determining that the interval has expired.

20 Claims, 20 Drawing Sheets

(56) References Cited

U.S. PATENT DOCUMENTS

| | | | | |
|---|---|---|---|---|
| 2014/0105175 A1* | 4/2014 | Dinan | ............... | H04W 56/0005 370/331 |
| 2014/0241285 A1* | 8/2014 | Pang | ............... | H04W 74/0833 370/329 |
| 2014/0269532 A1* | 9/2014 | Huang | ............... | H04W 74/006 370/329 |
| 2014/0349712 A1* | 11/2014 | Shukla | ............... | H04W 4/22 455/561 |
| 2015/0023281 A1* | 1/2015 | Wu | ............... | H04W 52/146 370/329 |
| 2015/0117183 A1* | 4/2015 | Heo | ............... | H04W 36/0055 370/228 |
| 2015/0319719 A1* | 11/2015 | Steudle | ............... | H04W 24/02 370/216 |
| 2015/0373599 A1* | 12/2015 | Kim | ............... | H04W 36/0083 370/331 |
| 2016/0057800 A1* | 2/2016 | Ingale | ............... | H04W 76/02 370/216 |

OTHER PUBLICATIONS

Unknown, Author, "Framework for RACH Parameter Optimization", Qualcomm Europe, 3GPP TSG RAN WG3, R3-090697, Seoul, Korea, Mar. 23-26, 2009, 1-3.

* cited by examiner

Aggregated bandwidth of 100 MHz

800

MAINTAIN A PREAMBLE TRANSMISSION ATTEMPT COUNTER THAT TRACKS THE NUMBER OF RANDOM ACCESS PREAMBLE TRANSMISSIONS THAT ARE TRIGGERED AND/OR INITIATED IN THE RANDOM ACCESS PROCEDURE, INCLUDING RANDOM ACCESS PREAMBLE TRANSMISSIONS THAT ARE ABORTED PRIOR TO COMPLETION OF THE TRANSMISSION
810

TERMINATE THE RANDOM ACCESS PROCEDURE IN RESPONSE TO DETERMINING THAT THE PREAMBLE TRANSMISSION ATTEMPT COUNTER INDICATES THAT A PREDETERMINED THRESHOLD NUMBER OF TRANSMISSION ATTEMPTS HAVE BEEN MADE
820

*FIG. 8*

HANDLING PHYSICAL RANDOM ACCESS CHANNEL TRANSMISSIONS IN MULTI-CARRIER SCENARIOS

TECHNICAL FIELD

The present disclosure is generally related to wireless communications network, and is more particularly related to resource allocation and random access procedures in networks that simultaneously support conventional wireless devices and machine-type-communication (MTC) devices.

BACKGROUND

Carrier Aggregation

The Long Term Evolution (LTE) Release 10 specifications have been standardized, providing support for Component Carrier (CC) bandwidths up to 20 MHz, which is the maximal LTE Rel-8 carrier bandwidth. LTE Rel-10 operation wider than 20 MHz is possible, whereby two or more LTE CCs are used by an LTE Rel-10 terminal. The straight-forward way to obtain bandwidths wider than 20 MHz is by means of Carrier Aggregation (CA). CA implies that an LTE Rel-10 terminal can receive multiple CCs, where the CCs each have, or at least the possibility to have, the same structure as a Rel-8 carrier. CA is illustrated in FIG. 1.

Release 10 of the LTE standards provides support for up to 5 aggregated CCs, where each CC is limited in the radio-frequency (RF) specifications to have one of six bandwidths, namely 6, 15, 25, 50, 75 or 100 RB, corresponding to 1.4, 3, 5, 10, 15 and 20 MHz respectively. The number of aggregated CCs as well as the bandwidth of the individual CCs may be different for uplink and downlink. A symmetric configuration refers to the case where the number of CCs in downlink (DL) and uplink (UL) is the same, whereas an asymmetric configuration refers to the case that the number of CCs is different in DL and UL. It is important to note that the number of CCs configured in the network may be different from the number of CCs seen by a terminal: A terminal may support more downlink CCs than uplink CCs, for example, even though the network offers the same number of uplink and downlink CCs.

CCs are also referred to as cells or serving cells. More specifically, in an LTE network the cells aggregated by a terminal include one carrier denoted the primary component carrier or primary Serving Cell (PCell), and one or more others referred to as secondary component carriers or secondary Serving Cells (SCells). The term "serving cell" comprises both PCell and SCells. All UEs have one PCell; which cell is a UE's PCell is terminal specific. The PCell for a given UE is considered "more important" to the UE than its SCells, since vital control signaling and other important signaling are typically handled via the PCell. Uplink control signaling is always sent on a UE's PCell. The component carrier configured as the PCell is the primary CC whereas all other component carriers are secondary serving cells.

During initial access, an LTE Rel-10 terminal behaves similarly to an LTE Rel-8 terminal. However, upon successful connection to the network a Rel-10 terminal may—depending on its own capabilities and the network—be configured with additional serving cells in the UL and DL. Configuration is done using Radio Resource Control (RRC) signaling. Due to the heavy signaling and rather slow speed of RRC signaling it may typically be the case that a terminal is configured with multiple serving cells, even though not all of them are currently used.

SCell Activation and Deactivation

With the concept of SCells, additional bandwidth resources can be configured and de-configured dynamically, in response to the UE's needs. The configuration and de-configuration of cells is signaled by the eNB and performed with RRC signaling, which is heavy signaling and slow. Since RRC signaling is heavy and slow, a separate concept of activation and deactivation has been introduced for SCells. The eNB has the possibility to deactivate any serving cells that the eNB decides the UE should not use or does not need for the moment. Activation and deactivation of SCells are performed with Medium Access Control (MAC) signaling, which is faster than RRC signaling. Each SCell is configured with a SCellIndex, which is an identifier or so called Cell Index which is unique among all serving cells configured for this UE. The PCell always have Cell Index 0 and SCell can have a integer cell index of 1 to 7.

The Rel-10 Activation/Deactivation MAC Control Element (CE) consists of a single octet containing seven C-fields and one R-field. Each C-field corresponds to a specific SCellIndex and indicates whether the specific SCell is activated or deactivated. The UE will ignore all C-fields associated with Cell indices not being configured. The Activation/Deactivation MAC CE always indicates the activation status of all configured SCells, meaning that if the eNB wants to activate one SCell it has to include all configured SCells, setting the bit corresponding to each one to indicate activated or deactivated, even if the status for the corresponding SCell has not changed.

If a UE's secondary serving cell is activated, the UE has to monitor the Physical Downlink Control Channel (PDCCH) and Physical Downlink Shared Channel (PDSCH) for that serving cell. This implies a wider receiver bandwidth, higher sampling rates, etc., at the UE, resulting in higher power consumption than if that serving cell were deactivated.

Dual Connectivity

In dual connectivity (DC), the UE can be served by two nodes, called the master eNB (MeNB) and the secondary eNB (SeNB). The UE is configured with a PCC from both MeNB and SeNB. The group of cells associated with the MeNB is referred to as the Master Cell Group (MCG), while the group of cells associated with the SeNB is referred to as the Secondary Cell Group (SCG). Thus, the UE is configured with a PCC from each of the MCG and SCG. The PCell from MeNB and SeNB are called PCell and PSCell (Primary SCell) respectively. Sometimes PSCell is referred to as Special SCell. The PCell and PSCell operate the UE typically independently. The UE is also configured with one or more SCCs from each of MeNB and SeNB. The corresponding secondary serving cells served by MeNB and SeNB are called SCell. The UE in DC typically has separate TX/RX for each of the connections with MeNB and SeNB. This allows the MeNB and SeNB to independently configure the UE with one or more procedures e.g. radio link monitoring (RLM), DRX cycle etc on their PCell and PSCell respectively.

Random Access

In LTE, as in any communication system, a mobile terminal may need to contact the network (via the eNodeB) without yet having a dedicated resource in the uplink (from UE to base station). To handle this, a random access procedure is available, whereby a UE that does not have a dedicated uplink resource may transmit a signal to the base station. The first message (MSG1 or preamble) of this procedure is typically transmitted on a special resource reserved for random access, a physical random access channel (PRACH). This channel can, for instance, be limited in time and/or frequency (as in LTE). See FIG. 2. The resources available for PRACH transmissions are identified to mobile terminals as part of the broadcasted system information (or as part of dedicated RRC signaling in some cases, such as in the case of a handover).

In LTE, the random access procedure can be used for a number of different reasons. Among these reasons are:
initial access, for UEs in the LTE_IDLE or LTE_DE-TACHED states;
an incoming handover;
resynchronization of the uplink;
a scheduling request, for a UE that is not allocated any other resource for contacting the base station; and
positioning.

The eNodeB can also order the UE, through a PDCCH message, to perform a contention based random access. The contention-based random access procedure used in LTE is illustrated in FIG. 3. The UE starts the random access procedure by randomly selecting one of the preambles available for contention-based random access. The UE then transmits the selected random access preamble on the PRACH to the eNodeB in the Radio Access Network (RAN).

The RAN acknowledges any preamble it detects by transmitting a random access response (MSG2), which includes an initial grant to be used on the uplink shared channel, a temporary Cell Radio Network Temporary Identification (C-RNTI) for the UE, and a time alignment (TA) update. The TA update is based on the timing offset of the preamble measured by the eNodeB on the PRACH. The MSG2 is transmitted in the downlink to the UE and its corresponding PDCCH message cyclic redundancy code (CRC) is scrambled with a Random Access Radio Network Temporary Identifier (RA-RNTI).

After receiving the random access response (MSG2), the UE uses the grant to transmit a message (MSG3) back to the RAN. The MSG3 is used, in part, to trigger the establishment of RRC and in part to uniquely identify the UE on the common channels of the cell. The timing advance command that was provided to the UE in the random access response is applied in the UL transmission in MSG3. The eNodeB can change the resources blocks that are assigned for a MSG3 transmission by sending a UL grant having its CRC scrambled with a Temporary Cell Radio Network Temporary Identifier (TC-RNTI).

The procedure ends with the RAN solving any preamble contention that may have occurred for the case that multiple UEs transmitted the same preamble at the same time. This can occur because each UE randomly selects when to transmit and which preamble to use. If multiple UEs select the same preamble for the transmission at the same time on the Random Access Channel (RACH), there will be contention between these UEs. The RAN resolves this contention using the contention resolution message (MSG4). MSG4, which is sent by the eNodeB for contention resolution, has its PDCCH CRC scrambled with the C-RNTI if the UE previously has a C-RNTI assigned. If the UE does not have a C-RNTI previously assigned has its PDCCH CRC is scrambled with the TC-RNTI.

The case when contention occurs is illustrated in FIG. 4, where two UEs transmit the same preamble, $p_5$, at the same time. A third UE also transmits at the same RACH, but since it transmits with a different preamble, $p_1$, there is no contention between this UE and the other two UEs.

The UE can also perform non-contention-based random access. A non-contention-based random access or contention-free random access can be initiated by the eNodeB, for example, to get the UE to achieve synchronization in the uplink. The eNodeB initiates a non-contention-based random access either by sending a PDCCH order or indicating it in an RRC message. The latter of these two approaches is used in the case of a handover.

The procedure for the UE to perform contention-free random access is illustrated in FIG. 5. As with the contention-based random access, the MSG2 is transmitted in the downlink to the UE and its corresponding PDCCH message CRC is scrambled with the RA-RNTI. The UE considers the contention resolution successfully completed after it has received MSG2 successfully.

For the contention-free random access, as for the contention-based random access, the MSG2 contains a timing alignment value. This enables the eNodeB to set the initial/updated timing according to the UEs transmitted preamble. In LTE in Rel-10, the random access procedure is limited to the primary cell only. This means that the UE can only send a preamble on the primary cell. Furthermore, MSG2 and MSG3 are received and transmitted only on the primary cell. However, MSG4 can be transmitted on any downlink cell, in Rel-10.

In LTE Rel-11, the current assumption is that the random access procedure will be supported also on secondary cells, at least for the UEs supporting Rel-11 carrier aggregation. So far, only network-initiated random access on SCells is assumed.

Random Access Response Window

After a UE has sent a random access preamble, it listens for a random access response from the network for a certain time, which is given by a value for a parameter referred to as the random access response window. After a time equal to the random access response window has passed, the UE considers the preamble transmission unsuccessful and resends the preamble. Each time the UE resends the preamble, the UE increases the output power used to transmit the preamble to increase the chance of a successful preamble transmission. The UE transmits a maximum number of preambles given by a value referred to as the preamble transmission maximum.

SUMMARY

According to current specifications for LTE, in Dual Connectivity the terminal may perform parallel random access procedures, but not parallel preamble transmissions. The UE therefore may need to abort or suspend preamble transmissions such that only one preamble transmission occurs at one point in time.

With regard to various embodiments described herein, some distinctions should be made clear. If a random access preamble transmission is aborted and not completely transmitted, the preamble transmission will not be considered to have been successfully completed. However, this will still be considered a preamble transmission attempt. That is, a preamble transmission attempt is made whether the preamble was successfully transmitted or not. While a preamble transmission may be considered successful if the preamble transmission is completed, this does not necessarily mean that the preamble transmission was successfully received at the base station. A preamble transmission is successfully received when a random access response message from the base station is received by the UE.

A UE performing a random access procedure currently maintains a random access preamble transmission counter that counts the number of completed random access preamble transmissions in the random access procedure. According to various embodiments described herein, the UE also maintains a random access preamble transmission attempt counter that counts the number of random access preamble transmission attempts, no matter whether the transmissions were successfully completed or not. This means that aborted preamble transmissions, not counted by the conventional preamble transmission counter, are counted by the preamble transmission attempt counter. According to some of the techniques described herein, the UE uses the random access transmission attempt counter to perform a limited number of preamble transmission attempts, regardless of whether the preamble transmission was successful. This approach may be used to ensure that the UE is not sending more preambles than expected from the network, and to ensure that preamble transmission power is not higher than needed and/or expected by the network.

Accordingly to some embodiments, a method in a wireless terminal for performing a random access procedure in a wireless network includes maintaining a preamble transmission attempt counter that tracks the number of random access preamble transmissions that are triggered and/or initiated in the random access procedure, including random access preamble transmissions that are aborted prior to completion of the transmission. The method also includes terminating the random access procedure in response to determining that the preamble transmission attempt counter indicates that a predetermined threshold number of transmission attempts have been made.

According to some embodiments, a wireless terminal apparatus is adapted to maintain a preamble transmission attempt counter that tracks the number of random access preamble transmissions that are triggered and/or initiated in the random access procedure, including random access preamble transmissions that are aborted prior to completion of the transmission. The wireless terminal is also adapted to terminate the random access procedure in response to determining that the preamble transmission attempt counter indicates that a predetermined threshold number of transmission attempts have been made.

According to some embodiments, a method in a wireless terminal for performing a random access procedure in a wireless network includes tracking time during an interval in which a preamble may be used in the random access procedure and terminating the random access procedure in response to determining that the interval during which the preamble may be used has expired.

According to some embodiments, a wireless terminal apparatus is adapted to track time during an interval in which a preamble may be used in the random access procedure and terminate the random access procedure in response to determining that the interval during which the preamble may be used has expired.

According to some embodiments, a method in a wireless terminal for performing a random access procedure in a wireless network includes maintaining a preamble transmission attempt counter that tracks a number of random access preamble transmissions that are triggered at the physical layer in the random access procedure. The method also includes maintaining a preamble transmission counter that tracks a timing of when to increment a power level of the random access preamble.

According to some embodiments, a wireless terminal apparatus is adapted to maintain a preamble transmission attempt counter that tracks a number of random access preamble transmissions that are triggered at the physical layer in the random access procedure and maintain a preamble transmission counter that tracks a timing of when to increment a power level of the random access preamble.

According to some embodiments, a wireless terminal apparatus includes a radio transceiver adapted to communicate with a wireless network and one or more processing circuits adapted to carry out the methods in a wireless terminal described above.

According to some embodiments, a method in a node of a wireless network includes receiving a report from a wireless terminal, the report indicating that at least one attempted preamble transmission for the random access procedure was not completed by the wireless terminal. The method also includes adjusting a configuration for the wireless terminal, based on the report.

According to some embodiments, a network node apparatus adapted to receive a report from a wireless terminal, the report indicating that at least one attempted preamble transmission for the random access procedure was not completed by the wireless terminal and adjust a configuration for the wireless terminal, based on the report.

According to some embodiments, a network node apparatus includes a radio transceiver adapted to communicate with a wireless terminal and one or more processing circuits adapted to carry out the methods in a network node described above.

Further embodiments may include computer program products and non-transitory computer readable media that store instructions that, when executed by processing circuit, perform the operations of the embodiments describe above.

Details of several embodiments of techniques and apparatuses for performing random access procedures are described and illustrated below.

BRIEF DESCRIPTION OF THE DRAWINGS

FIG. 8 is a flowchart illustrating a method in a user equipment for performing a random access procedure, according to some embodiments.

DETAILED DESCRIPTION

Inventive concepts will now be described more fully hereinafter with reference to the accompanying drawings, in which examples of embodiments of inventive concepts are shown. These inventive concepts may, however, be embodied in many different forms and should not be construed as limited to the embodiments set forth herein. Rather, these embodiments are provided so that this disclosure will be thorough and complete, and fully convey the scope of present inventive concepts to those skilled in the art. It should also be noted that these embodiments are not mutually exclusive. Components from one embodiment may be tacitly assumed to be present or used in another embodiment.

For purposes of illustration and explanation only, embodiments of the present inventive concepts are described herein in the context of operating in or in association with a RAN that communicates over radio communication channels with mobile terminals, also interchangeably referred to as wireless terminals or UEs, using a particular radio access technology. More specifically, embodiments are described in the context of the E-UTRAN, sometimes referred to as the Evolved UMTS Terrestrial Radio Access Network and widely known as the LTE system. However, it will be appreciated that the techniques may be applied to other wireless networks, as well as to successors of the E-UTRAN. Thus, references herein to signals using terminology from the 3GPP standards for LTE should be understood to apply more generally to signals having similar characteristics and/or purposes, in other networks.

Figure 1:
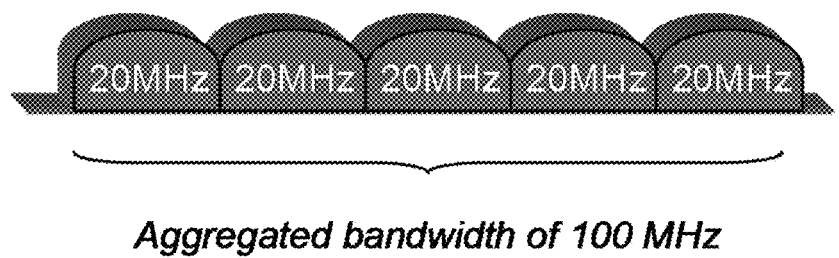
FIG. 1 is a diagram illustrating carrier aggregation.
Figure 2:
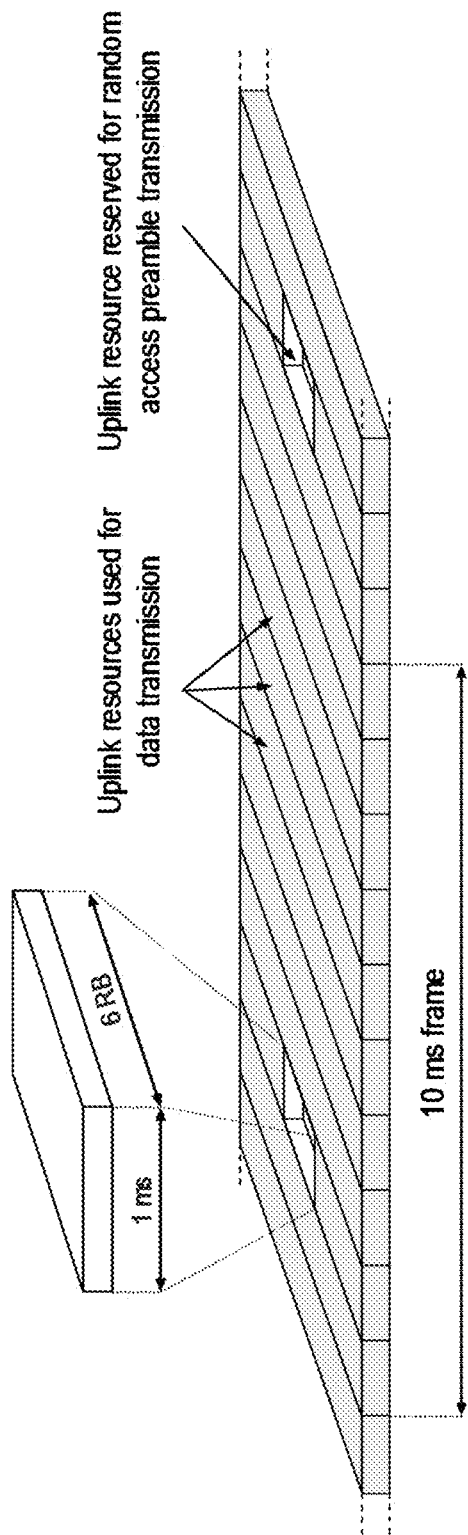
FIG. 2 is a diagram illustrating random access preamble transmission.
Figure 3:
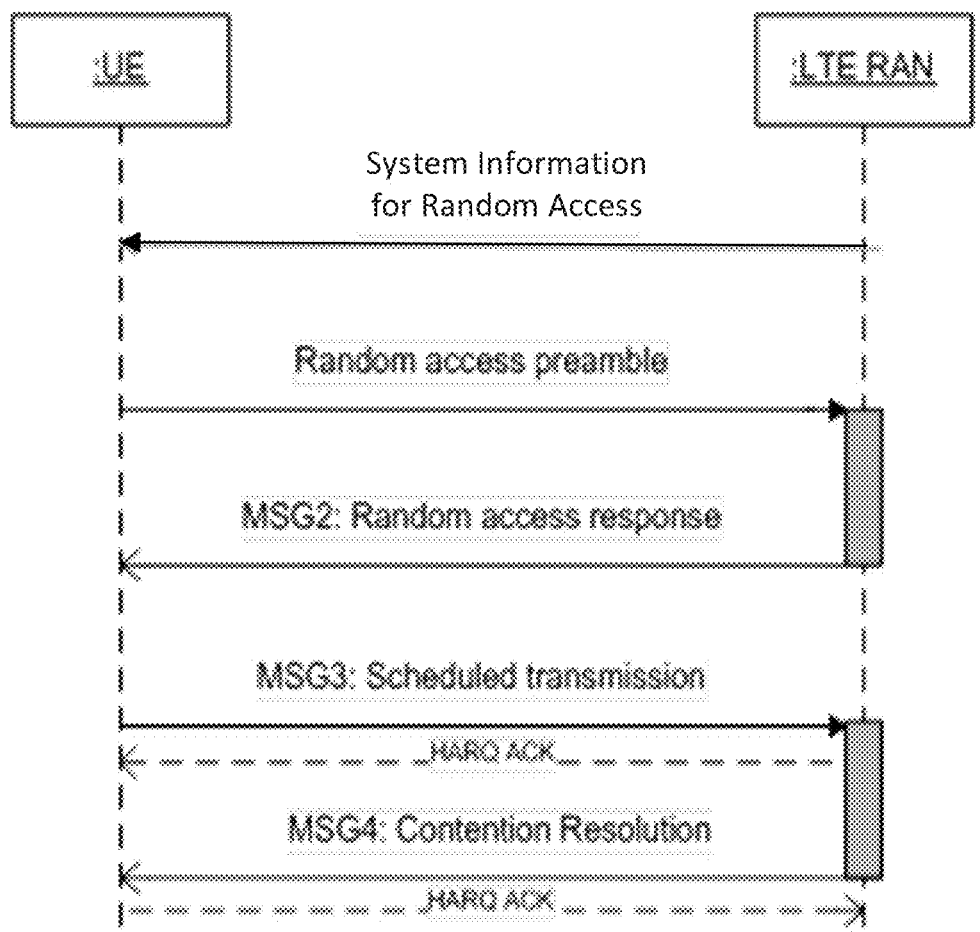
FIG. 3 is a diagram illustrating signaling for the contention-based random access procedure in LTE.
Figure 4:
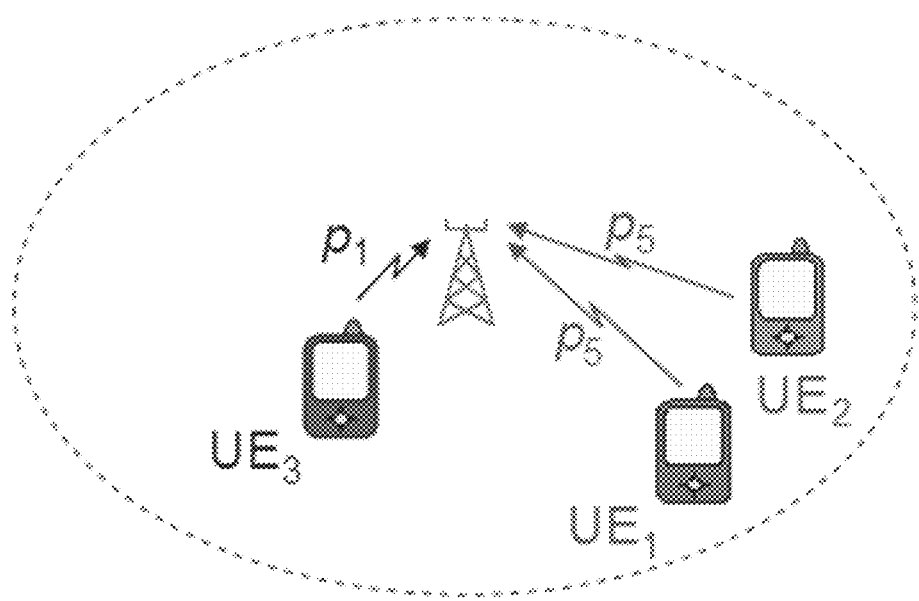
FIG. 4 illustrates contention based random access, where there is contention between UEs.
Figure 5:
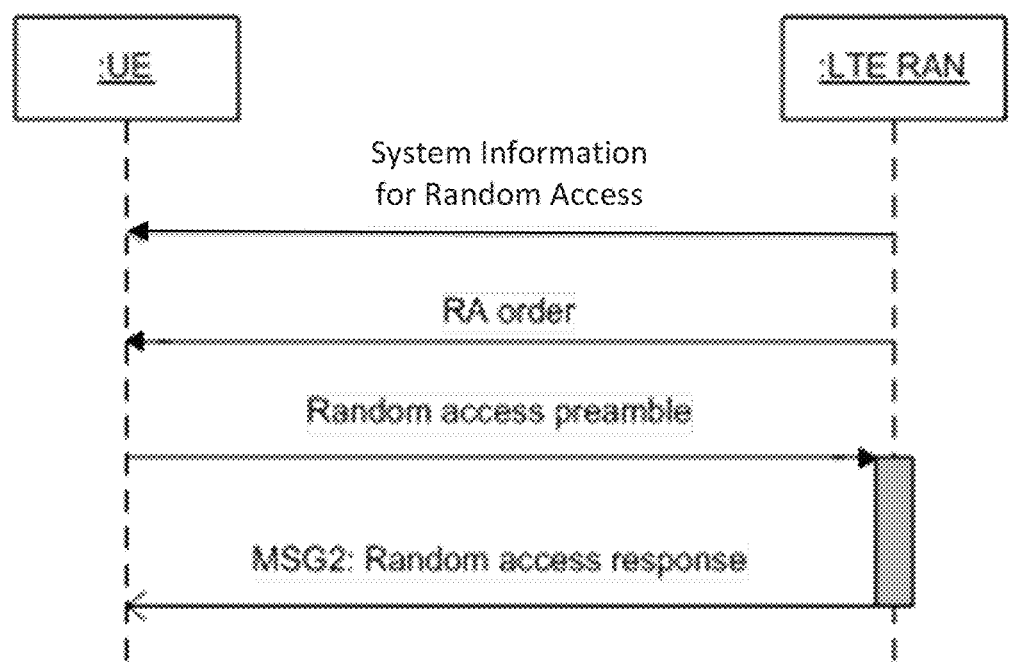
FIG. 5 is a diagram illustrating signaling over the air interface for the contention-free random access procedure in LTE.
Figure 6:
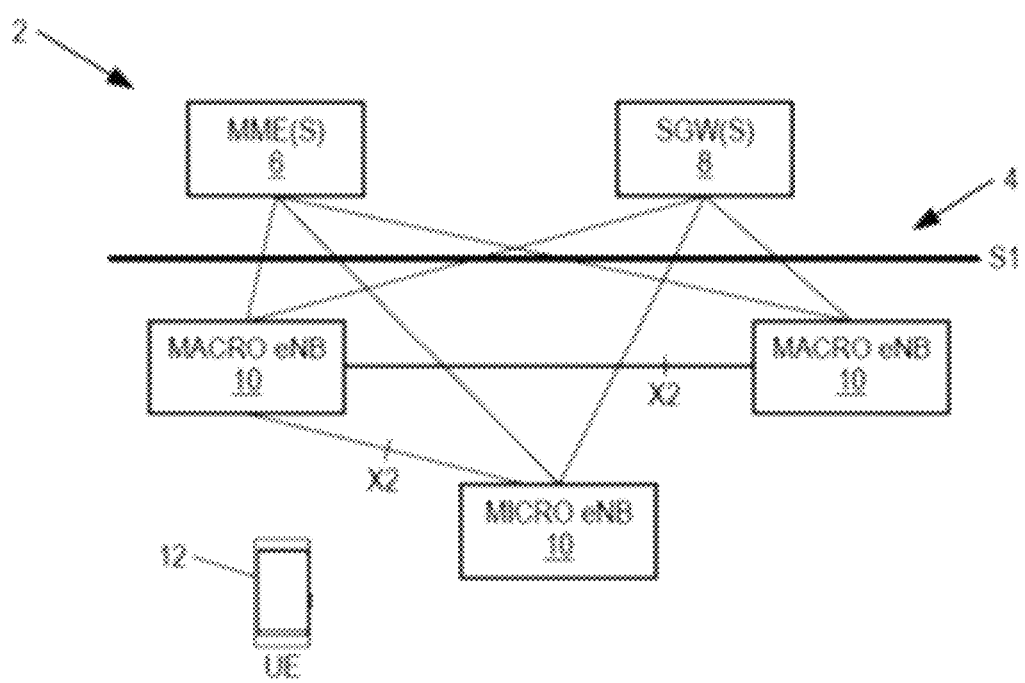
FIG. 6 is a diagram illustrating a EUTRAN network.

FIG. 6 shows an example diagram of an EUTRAN architecture, as part of an LTE-based communications system 2. Nodes in the core network 4 include one or more Mobility Management Entities (MMEs) 6, a key control node for the LTE access network, and one or more Serving Gateways (SGWs) 8, which route and forward user data packets while acting as a mobility anchor. They communicate with base stations 10, referred to in LTE as eNodeBs or eNBs, over an interface, for example an S1 interface. The eNBs 10 can include the same or different categories of eNBs, e.g. macro eNBs, and/or micro/pico/femto eNBs. The eNBs 10 communicate over an interface, for example an X2 interface. The S1 interface and X2 interface are defined in the LTE standards. A UE 12 can receive downlink data from and send uplink data to one of the eNBs 10, with that eNB 10 being referred to as the serving base station 10 of the UE 12. It should be appreciated that while the techniques described herein may be applied in the context of an EUTRAN network, e.g., as illustrated in FIG. 6, the techniques may also be applied in other network contexts, including in UTRA networks.

Note that in some of the embodiments described herein, the terms "user equipment" and "UE" are used. A UE, as that term is used herein, can be any type of wireless device capable of communicating with a network node or another UE over radio signals. A UE may also be referred to as a wireless device, a radio communication device, a wireless terminal, or simply a terminal—unless the context indicates otherwise, the use of any of these terms is intended to include device-to-device UEs, machine-type UEs or UEs capable of machine-to-machine communication, sensors equipped with a UE, wireless-enabled table computers, mobile terminals, smart phones, laptop-embedded equipped (LEE), laptop-mounted equipment (LME), USB dongles, wireless customer-premises equipment (CPE), etc. In the discussion that follows, the terms machine-to-machine (M2M) device, machine-type communication (MTC) device, wireless sensor, and sensor may also be used. It should be understood that these devices are UEs, but are generally configured to transmit and/or receive data without direct human interaction.

Figure 7:
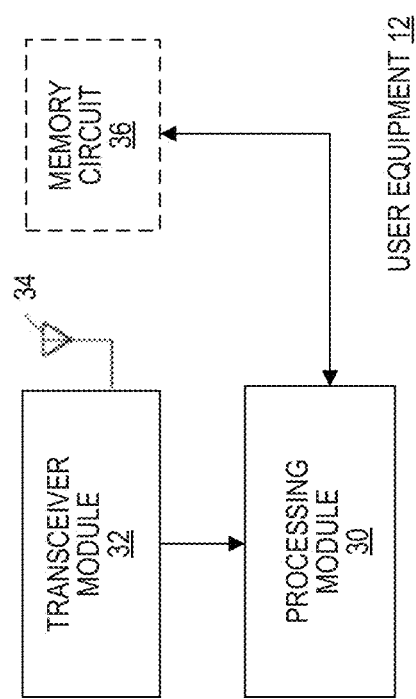
FIG. 7 is a block diagram of a user equipment configured to perform a random access procedure, according to some embodiments.

FIG. 7 shows a UE 12, which may be more generally referred to a wireless terminal and which can be used in one or more of the example embodiments described herein. The UE 12 may in some embodiments be a mobile device that is configured for M2M or MTC. The UE 12 comprises a processing module 30 that controls the operation of the UE 12. The processing module 30, which may comprise one or more microprocessors, microcontrollers, digital signal processors, specialized digital logic, etc., is connected to a receiver or transceiver module 32 with associated antenna(s) 34 which are used to receive signals from or both transmit signals to and receive signals from a base station 10 in the network 2. The UE 12 also comprises a memory circuit 36 that is connected to the processing module 30 and that stores program code and other information and data required for the operation of the UE 12. Together, the processing module 30 and memory circuit 36 may be referred to as a "processing circuit," and are adapted, in various embodiments, to carry out one or more of the UE-based techniques described herein.

For example, the processing circuit of UE 12 may be configured to perform a random access procedure in a wireless network. The processing circuit 30, 36 is configured to maintain a preamble transmission attempt counter that tracks the number of random access preamble transmissions that are triggered and/or initiated in the random access procedure, including random access preamble transmissions that are aborted prior to completion of the transmission. The processing circuit 30, 36 is also configured to terminate the random access procedure in response to determining that the preamble transmission attempt counter indicates that a predetermined threshold number of transmission attempts have been made.

Regardless of the implementation, the processing circuit of UE 12 is configured to perform a method 800 as shown in FIG. 8. The method 800 includes maintaining a preamble transmission attempt counter that tracks the number of random access preamble transmissions that are triggered and/or initiated in the random access procedure, including random access preamble transmissions that are aborted prior to completion of the transmission (Block 810).

The method 800 may include incrementing the preamble transmission attempt counter for each attempted preamble transmission that is triggered and/or initiated in the random access procedure, without regard to whether the attempted preamble transmission is completed by the UE 12 and without regard to whether a completed preamble transmission is received. The method may also include maintaining a preamble transmission counter, in addition to the preamble transmission attempt counter, that tracks the number of random access preamble transmissions that are completed by the UE 12, but without regard to whether the random access preamble transmissions are successfully received.

In another example, a random access procedure is one of two or more random access procedures at least partially overlapping in time, and maintaining the preamble transmission attempt counter comprises incrementing the preamble transmission attempt counter for at least one attempted preamble transmission that is aborted because of a collision with an attempted preamble transmission for another one of the random access procedures.

The method 800 also includes terminating the random access procedure in response to determining that the preamble transmission attempt counter indicates that a predetermined threshold number of transmission attempts have been made (Block 820).

In another example of performing a random access procedure, the processing circuit of UE 12 is configured to track time during an interval in which a preamble may be used in the random access procedure and terminate the random access procedure in response to determining that the interval during which the preamble may be used has expired.

Figure 9:
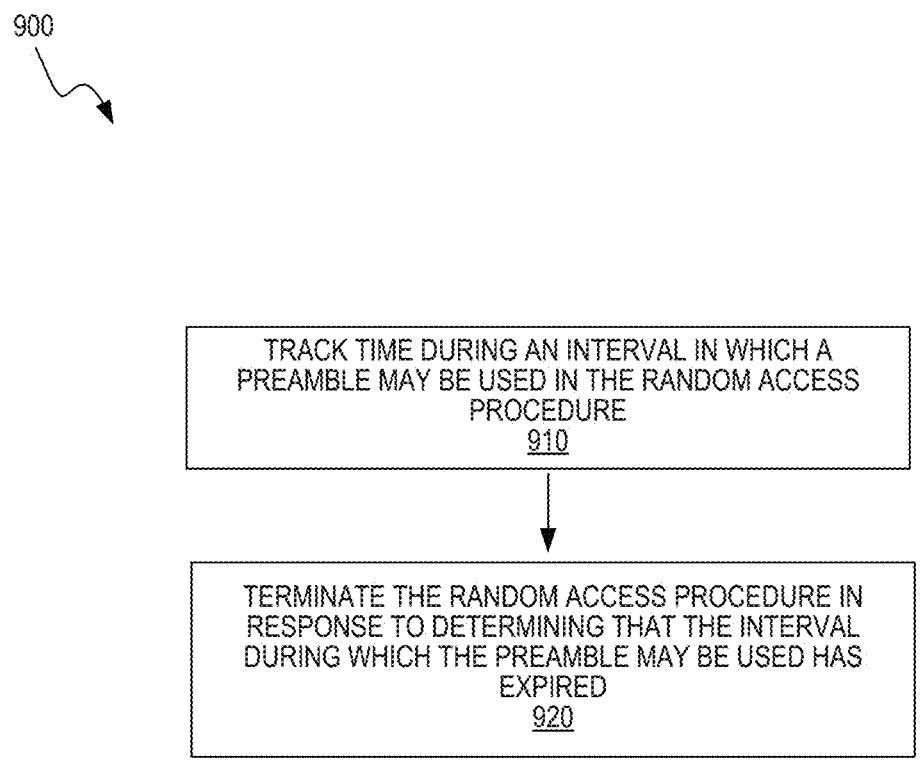
FIG. 9 is a flowchart illustrating another method in a user equipment for performing a random access procedure, according to some embodiments.

The processing circuit of UE 12 is configured to perform another method 900 as shown in FIG. 9. The method 900 includes tracking time during an interval in which a preamble may be used in the random access procedure (Block 910). The interval may be based on a number of preamble transmissions allowed and a random access response window size for each preamble transmission. The interval may also include an offset to delay a time of a first preamble transmission following a triggering of the random access procedure.

The method 900 also includes terminating the random access procedure in response to determining that the interval during which the preamble may be used has expired (Block 920). The method 900 may also include sending a report to the wireless network, the report indicating that at least one attempted preamble transmission for the random access procedure was not completed by the UE 12. The report may be sent in response to determining that at least one attempted preamble transmission for the random access procedure was not completed by the UE 12.

In a further example of performing a random access procedure, the processing circuit of UE 12 is configured to maintain a preamble transmission attempt counter that tracks a number of random access preamble transmissions that are triggered at the physical layer in the random access procedure. The processing circuit of UE 12 is also configured to maintain a preamble transmission counter that tracks a timing of when to increment a power level of the random access preamble.

Figure 10:
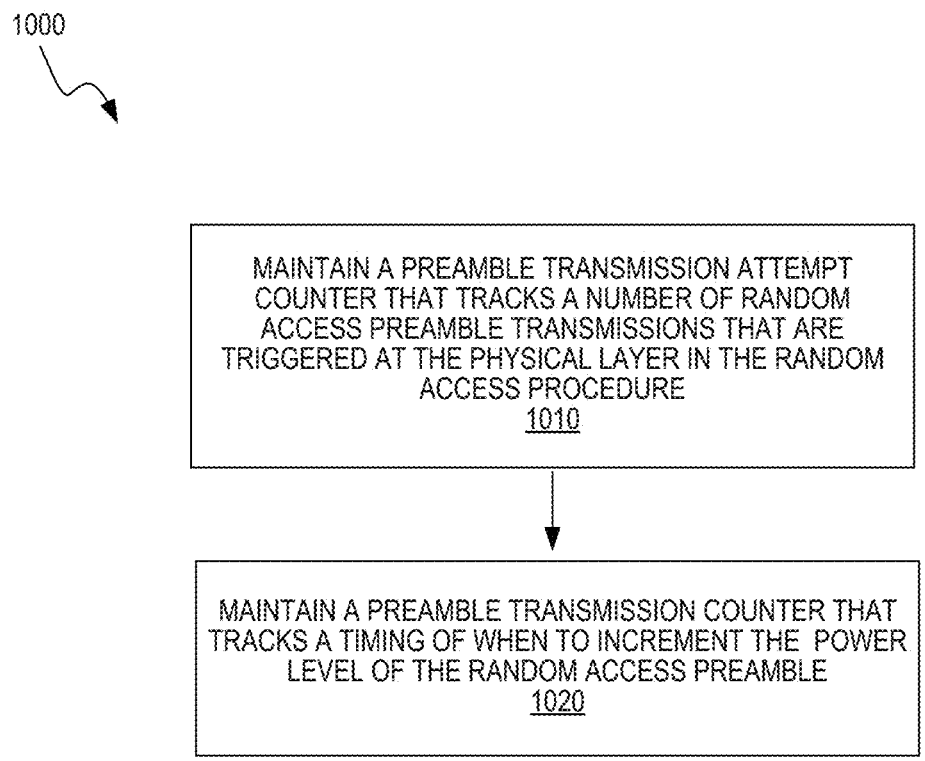
FIG. 10 is a flowchart illustrating another method in a user equipment for performing a random access procedure, according to some embodiments.

The processing circuit of UE 12 is configured to perform another method 1000 as shown in FIG. 10. The method 1000 includes maintaining a preamble transmission attempt counter that tracks a number of random access preamble transmissions that are triggered at the physical layer in the random access procedure (Block 1010). The method 1000 also includes maintaining a preamble transmission counter that tracks a timing of when to increment a power level of the random access preamble (Block 1020). In some cases, for a first preamble transmission, both the preamble transmission attempt counter and the preamble transmission counter are incremented. In other cases, for a first preamble transmission, the preamble transmission attempt counter is incremented, but the preamble transmission counter is not incremented.

According to some embodiments, the following is a possible implementation of the embodiments, as applied to the MAC specification in LTE, 3GPP TS 36.321, v12.3.0 (available at http://www.3gpp.org/dynareport/36321.htm). A proposed addition to the existing specification is shown with emphasis.

5.1.4 Random Access Response Reception

. . .

If no Random Access Response is received within the RA Response window, or if none of all received Random Access Responses contains a Random Access Preamble identifier corresponding to the transmitted Random Access Preamble, the Random Access Response reception is considered not successful and the UE shall:
increment PREAMBLE_TRANSMISSION_ATTEMPT_COUNTER by 1;
if the previous preamble transmission in this Random Access procedure was successful:
increase the PREAMBLE_TRANSMISSION_COUNTER by 1;
If PREAMBLE_TRANSMISSION_ATTEMPT_COUNTER=preambleTransMax+1:
if the Random Access Preamble is transmitted on the PCell:
indicate a Random Access problem to upper layers;
if the Random Access Preamble is transmitted on an SCell:
consider the Random Access procedure unsuccessfully completed.
if in this Random Access procedure, the Random Access Preamble was selected by MAC:
based on the backoff parameter in the UE, select a random backoff time according to a uniform distribution between 0 and the Backoff Parameter Value;
delay the subsequent Random Access transmission by the backoff time;
proceed to the selection of a Random Access Resource (see subclause 5.1.2).

. . .

5.1.3 Random Access Preamble transmission
The random-access procedure shall be performed as follows:
set PREAMBLE_RECEIVED_TARGET_POWER to preambleInitialReceivedTargetPower+DELTA_PREAMBLE+(PREAMBLE_TRANSMISSION_COUNTER−1)*powerRampingStep;
instruct the physical layer to transmit a preamble using the selected PRACH, corresponding RA-RNTI, preamble index and PREAMBLE_RECEIVED_TARGET_POWER.

In the above example, preambleTransMax is a parameter that is configured by the network; here it has been repurposed to serve as a limit on the number of attempted preamble transmissions, rather than on the number of actual preamble transmissions. Note that it is also possible to have two separately configured parameters, one setting a limit on the number of attempted transmissions and the other setting a limit on the number of actual transmissions. Note further that even if there is only one limit, i.e., limiting the number of transmission attempts, some embodiments may still maintain a separate counter to track the number of actual transmissions, with the counter value at any given time being used to determine the power level for the next attempted preamble transmission. (See Section 5.1.3 in the excerpted specification above.) As noted above, this approach better regulates the power level of the transmissions, as the transmission power is not increased after an aborted or blocked transmission.

Figure 11:
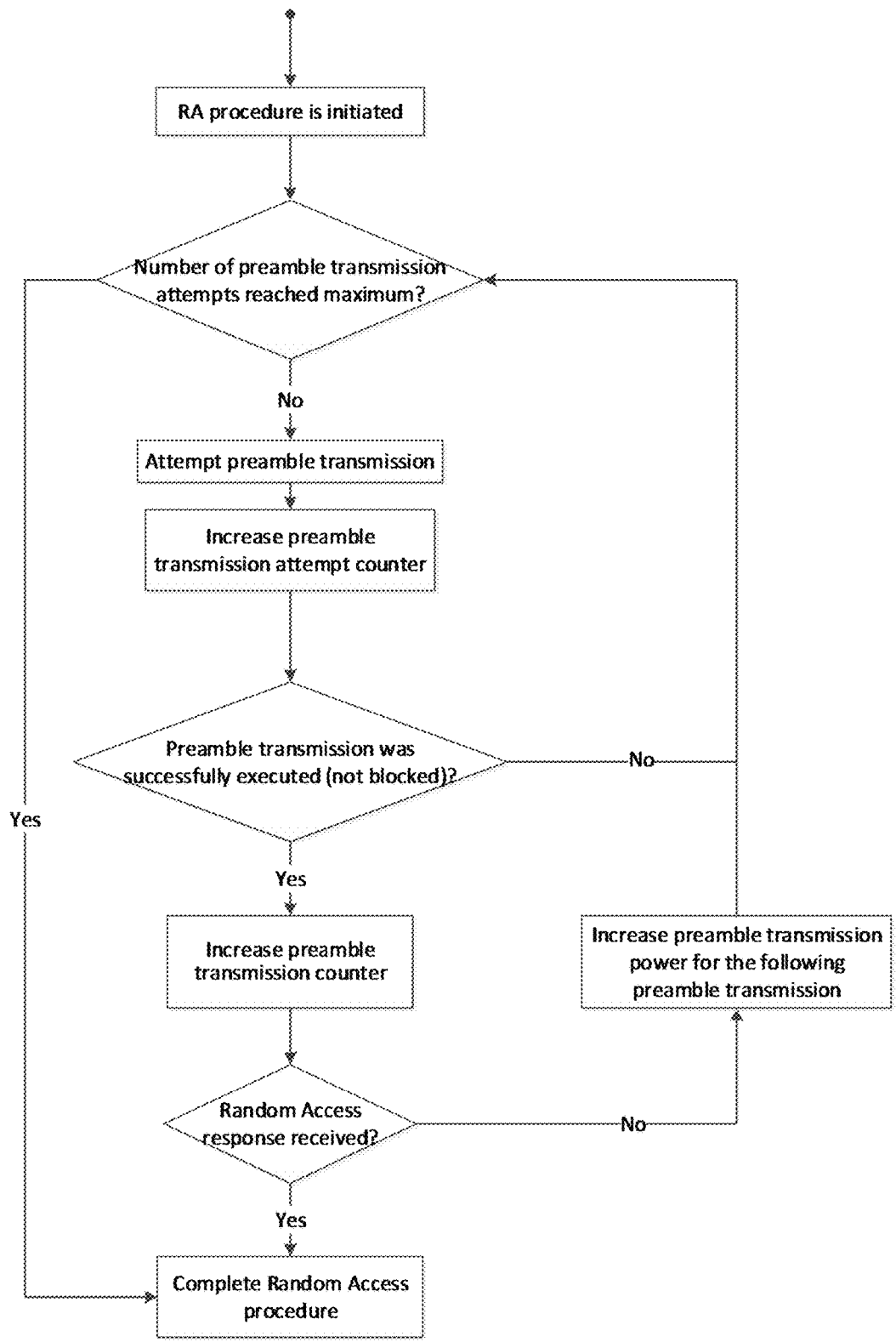
FIG. 11 is a flowchart illustrating a random access procedure, according to some embodiments.

FIG. 11 illustrates a process flow diagram implementing a few of the techniques described above. It should be noted that this example method employs two separate counters, one tracking the number of preamble transmission attempts and the other tracking the number of successfully completed preamble transmissions. FIG. 11 also demonstrates that the transmission power is only incremented in the event that a preamble transmission is actually sent (and not successfully received). As shown in the modified excerpt from 3GPP TS 36.321 above, the counter value indicating the number of actual preamble transmissions can be used in the calculation of the preamble transmission power. Accordingly, the processing circuit of UE 12 may be configured to calculate a power level for each random access preamble transmission attempt, based on the preamble transmission counter.

In some embodiments, the UE 12 increases the preamble transmission power in a Random Access procedure only if the preamble was successfully transmitted. Note that when it is here said that the preamble transmission was successfully executed, i.e., not aborted or delayed, it does not mean that the preamble reception was necessarily received by the eNB. In an example, the UE 12 first sends a preamble for which the UE 12 did not receive a Random Access response and then the UE 12 triggers but aborts a preamble transmission (i.e. a preamble transmission attempt which did not result in a transmitted preamble), only to finally send a successful preamble transmission (i.e. a preamble transmission attempt which resulted in an actual preamble transmission and this preamble transmission was successfully received at the eNB). In this case, the UE 12 would, according to current mechanisms, increase the preamble transmission power also for the aborted preamble transmission, which may be undesirable. According to some embodiments, the UE 12 refrains from increasing the transmission power when the UE 12 attempts to send a preamble but aborts the transmission. The benefit of this is that the PRACH power is only increased as much as is necessary to reach the eNB. Increasing the PRACH power due to PRACH collision is undesirable since (a) it wastes UE transmission power; (b) it unnecessarily causes high interference to other UEs; (c) it leaves little or no power for a potential, parallel, PUCCH/PUSCH/SRS transmission.

As shown in FIG. 11, the processing circuit of UE 12 may be configured to increment a power level for each random access preamble transmission attempt that follows a completed random access preamble transmission. This may also include a completed random access preamble transmission that is not determined by the UE 12 to have been successfully received. The processing circuit of UE 12 may increment a power level for each random access preamble transmission attempt that follows a completed random access preamble transmission, while refraining from incrementing the power level for any attempted random access preamble transmission that follows an attempted random access preamble transmission that is aborted before being completed by the UE 12. For example, FIG. 11 shows that a preamble transmission attempt counter is incremented for a preamble transmission attempt. If the preamble transmission is successfully executed and not blocked, the preamble transmission counter is incremented. If a random access response is received, indicating that the preamble transmission was successfully received by the base station, the random access procedure is completed. However, if a random access response is not received, the preamble transmission power is increased for the following preamble transmission. In various cases, whether or not the transmission power is increased depends on the preamble transmission counter, while the termination of the random access procedure depends on the preamble transmission attempt counter.

Figure 12:
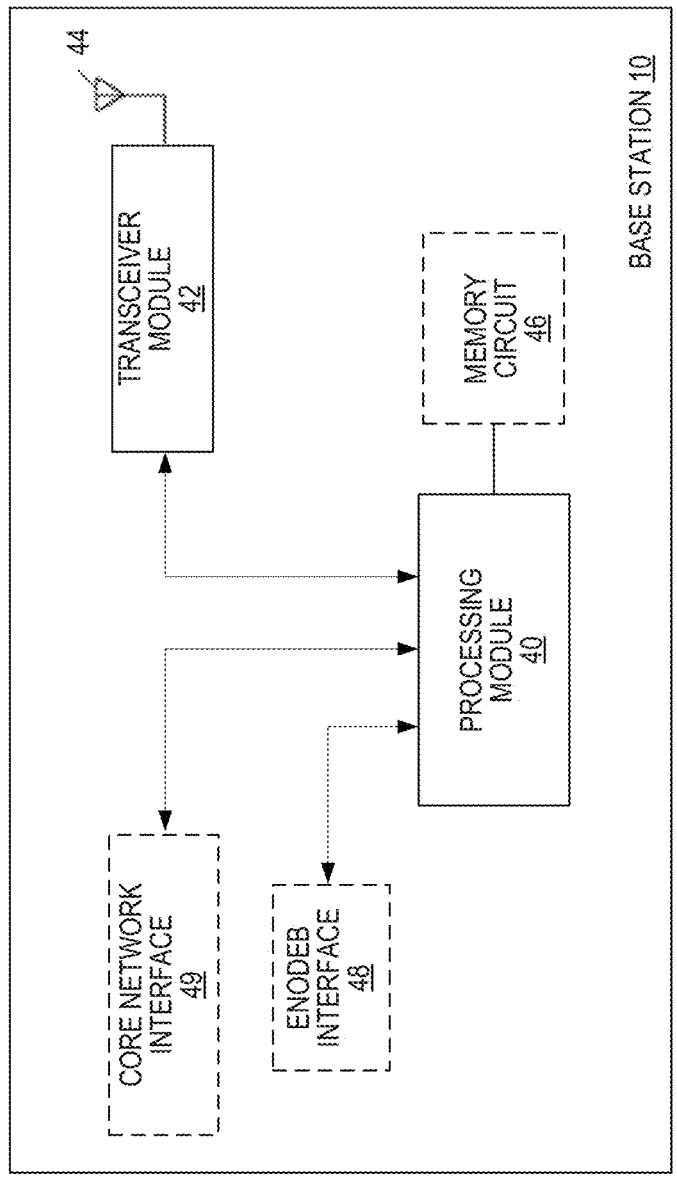
FIG. 12 is a block diagram of base station configured to receive reports pertaining to a random access procedure, according to some embodiments.

FIG. 12 shows a network node, such as a base station 10, that would receive a random access preamble transmission from the UE 12. In the description of some embodiments below, the generic terminology "radio network node" or simply "network node" or "NW node" is used. These terms refer to any kind of network node in the fixed portion of the wireless communication network, such as a base station, a radio base station, a base transceiver station, a base station controller, a network controller, an evolved Node B (eNodeB or eNB), a Node B, a relay node, a positioning node, a E-SMLC, a location server, a repeater, an access point, a radio access point, a Remote Radio Unit (RRU) Remote Radio Head (RRH), a multi-standard radio (MSR) radio node such as MSR base station nodes in distributed antenna system (DAS), a SON node, an O&M, OSS, or MDT node, a core network node, an MME, etc. As can be seen from these example, the term "fixed portion" of the wireless communication network is meant to refer to the portion of the wireless network other than the access terminals, i.e., the portion of the network that is accessed through a radio link by UEs, M2M devices, and the like, and is not meant to preclude the possibility that one or more elements in a given scenario can be moved. Referring once again to FIG. 6, for example, it will be appreciated that all of the illustrated elements other than UE 12 are examples of "network nodes" as that term is used herein, with the eNBs 10, which are equipped with radio transceivers for communication with one or more UEs 12, being examples of the narrower term "radio network node."

FIG. 12 shows a base station 10 (for example an eNB) that can be used in some of the example embodiments described herein. It will be appreciated that although a macro eNB will not, in practice, be identical in size and structure to a micro eNB, for the purposes of illustration, the base stations 10 are assumed to include similar components. Thus, whether or not base station 10 corresponds to a macro base station or a micro base station, it comprises a processing module 40 that controls the operation of the base station 10. The processing module 40, which may include one or more microprocessors, microcontrollers, digital signal processors, specialized digital logic, etc., is connected to a transceiver module 42 with associated antenna(s) 44 that are used to transmit signals to, and receive signals from, UEs 12 in the network 2. The base station 10 also comprises a memory circuit 46 that is connected to the processing module 40 and that stores program and other information and data required for the operation of the base station 10. Together, the processing module 40 and memory circuit 46 may be referred to as a "processing circuit," and are adapted, in various embodiments, to carry out one or more of the network-based techniques described below.

Base station 10 also includes components and/or circuitry 48 for allowing the base station 10 to exchange information with other base stations 10 (for example, via an X2 interface) and components and/or circuitry 49 for allowing the base station 10 to exchange information with nodes in the core network 4 (for example, via the S1 interface). It will be appreciated that base stations for use in other types of network (e.g., UTRAN or Wideband Code Division Multiple Access or WCDMA RAN) will include similar components to those shown in FIG. 12 and appropriate interface circuitry 48, 49 for enabling communications with the other network nodes in those types of networks (e.g., other base stations, mobility management nodes and/or nodes in the core network).

The processing circuit of base station 10 is configured to receive a report from a UE 12, the report indicating that at least one attempted preamble transmission for the random access procedure was not completed by the UE 12. The processing circuit of base station 10 is also configured to adjust a configuration for the UE 12, based on the report.

Figure 13:
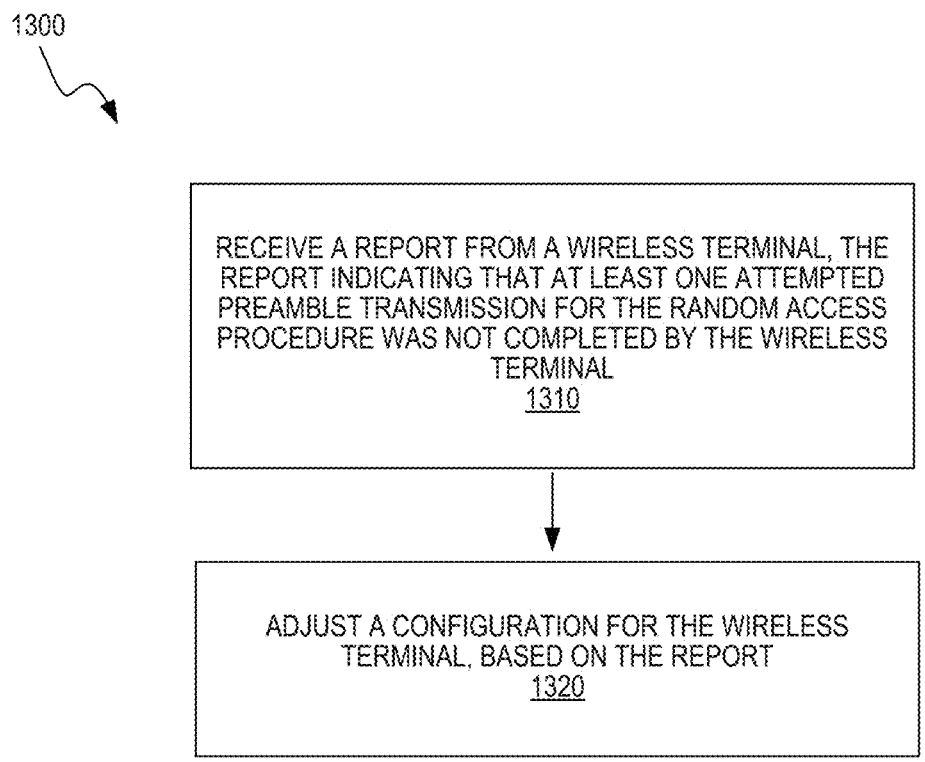
FIG. 13 is a flowchart illustrating a method in a base station for receiving reports pertaining to a random access procedure, according to some embodiments.

Regardless of the implementation, the processing circuit of base station 10 is also configured to perform a method 1300 shown in FIG. 13. The method 1300 includes receiving a report from a wireless terminal, the report indicating that at least one attempted preamble transmission for the random access procedure was not completed by the UE 12 (Block 1310).

The method 1300 also includes adjusting a configuration for the UE 12, based on the report (Block 1320). Adjusting the configuration 1320 for the UE 12 may include configuring the UE 12 so that it may attempt more preamble transmissions in a random access procedure. Adjusting a configuration 1320 for the UE 12 may also include indicating to the UE 12, based on a carrier or serving cell of the UE 12, to maintain a preamble transmission attempt counter that tracks the number of random access preamble transmissions that are triggered and/or initiated in the random access procedure and to terminate the random access procedure in response to determining that the preamble transmission attempt counter indicates that a predetermined threshold number of transmission attempts have been made. In some cases, adjusting a configuration 1320 for the UE 12 includes indicating to the UE 12, based on a carrier or serving cell of the UE 12, to provide reports to the network regarding random access preamble transmissions that are triggered and/or initiated in the random access procedure.

In some cases, the base station 10 may signal to the UE 12 a predetermined threshold number of transmission attempts to be made before the random access procedure is to be terminated.

According to some embodiments, the processing circuit of the UE 12 is configured to send reports, and the processing circuit of base station 10 is configured to request and/or receive such reports. A report may indicate a serving cell to which the at least one uncompleted attempted preamble transmission was sent. A report may also indicate how many attempted preamble transmissions for the random access procedure were not completed by the UE 12. A report may also indicate when attempted preamble transmissions for the random access procedure failed. A report may indicate the preamble used for the at least one uncompleted attempted preamble transmission or a reason for the incompletion of the at least one uncompleted attempted preamble transmission.

In some cases, the UE 12 receives configuration information from the base station 10 or the wireless network, the configuration information specifying the contents of the report, and the UE 12 forms the report so as to include the specified content. The report may be sent in response to a request received from the wireless network or in response to completing the random access procedure.

Figure 14:
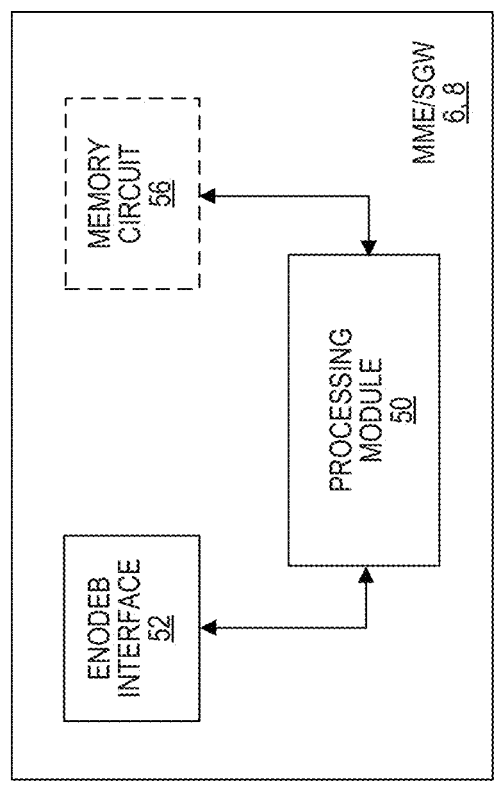
FIG. 14 is a block diagram of a network node configured to signal information pertaining to a random access procedure, according to some embodiments.

In some embodiments, actions described as being performed by the base station 10 may also be performed by another network node, such as a core network node. FIG. 14 shows a core network node 6, 8 that can be used in the example embodiments described. The node 6, 8 comprises a processing module 50 that controls the operation of the node 6, 8. The processing module 50, which may include one or more microprocessors, microcontrollers, digital signal processors, specialized digital logic, etc., is connected to components and/or circuitry 52 for allowing the node 6, 8 to exchange information with the base stations 10 with which it is associated (typically via the S1 interface). The node 6, 8 also comprises a memory circuit 56 that is connected to the processing module 50 and that stores program and other information and data required for the operation of the node 6, 8. Together, the processing module 50 and memory circuit 56 may be referred to as a "processing circuit," and are adapted, in various embodiments, to carry out one or more of the network-based techniques described below.

It will be appreciated that FIGS. 7-14 illustrate only those components of the UE 12, base station 10, and core network node 4, 6 that are needed to explain the embodiments presented herein, and will, in practical implementations include many other elements that are well understood by those familiar with the design and implementation of such devices.

The improvements over the current standards, provided by the embodiments, will now be explained in additional detail. In a UE supporting carrier aggregation (CA), there is only one Random Access procedure ongoing at any point in time. If the UE receives a request for a new Random Access procedure while another is already ongoing, it is up to UE implementation whether to continue with the ongoing procedure or start with the new procedure.

In dual-connectivity, on the other hand, the MeNB and SeNB have independent MAC functionalities, and they can simultaneously order UE to perform Random Access processes. In general, in dual-connectivity, multiple simultaneous Random Access procedures are allowed, for example, one RA towards the MCG, another RA towards the SCG. When the UE is not power limited, two (or more) simultaneous PRACH transmissions can operate independently, each Random Access procedure operating in the same way as it would in CA. However, when the UE is power-limited, two (or more) simultaneous PRACH transmissions at the physical layer affect each other, and cannot be viewed as independent.

Two PRACH transmissions, one for MCG, the other for SCG, can overlap due to at least the following reasons:
1. MCG and SCG are not synchronized in subframe boundaries. The uplink transmission timing towards MCG and towards SCG are misaligned.
2. The duration of PRACH to MCG and the duration of PRACH to SCG are not necessarily the same. For example, one can be 1 subframe (1 ms) long, while the other is
3 subframes (3 ms) long.

It should be noted that the terms "PRACH transmissions," "PRACH preamble transmissions," or just "preamble transmissions" will be used interchangeably in this document.

There are several ways a UE could handle simultaneous PRACH transmissions in a power limited situation. In one option, the UE can still maintain the two (or more) simultaneous PRACH transmissions, but treats one of the transmissions as having higher priority. With this first approach, the UE does not scale down the power level of the higher-priority PRACH, but the UE reduces the power level of a lower-priority PRACH if there is any power left over after satisfying the need of the higher-priority PRACH. No PRACH transmission is delayed or dropped as long as there is any uplink transmission power available (although the power levels can be reduced). Dropping or delaying of the second PRACH may occur if all the uplink power has been exhausted by an overlapping first PRACH.

In another approach, the UE only maintains one PRACH transmission. The other, colliding PRACH transmission is always dropped or delayed. Note that in this option, only a given instance of preamble (PRACH) transmission is aborted, not the entire Random Access process. In one example, the higher priority PRACH is maintained, while the lower priority PRACH(s) are always dropped or delayed. In another example, the earlier PRACH is maintained, while the later, overlapping PRACH is dropped or delayed.

In yet another approach, the UE only maintains one Random Access procedure when collision occurs in a power-limited scenario. That is, for the affected Random Access procedure, the entire Random Access procedure is aborted, as compared to delaying and retrying the given instance of the preamble (PRACH) transmission at a later time. In one example, the Random Access procedure associated with the higher priority PRACH is maintained, while the Random Access procedure associated with the lower priority PRACH(s) are aborted. In another example, the Random Access procedure associated with the earlier PRACH is maintained, while the Random Access procedure associated with the later, potentially overlapping PRACH is aborted.

In still another approach, a hybrid of the above approaches may be utilized. Different handing of the preamble transmission and Random Access procedure can be applied, depending on any of one or more factors, such as the type of RACH, i.e., whether the Random Access procedure is UE-initiated or ordered by the eNB, the reasons for the RACH (e.g., downlink data arrival, uplink data arrival, synchronization, etc.), and/or the number of RACH attempts that have occurred. For example:

In some embodiments, if the RACH procedure is initiated by the UE, e.g., due to uplink data arrival, and collision occurs during the first preamble attempt, the entire random access procedure is aborted until a later time. If a collision instead occurs during a later preamble attempt, then the preamble is aborted but the RA procedure is not canceled.

In some embodiments, if the RACH procedure is PDCCH-ordered, the RA procedure is never canceled; only individual instances of the preamble transmission are delayed or dropped.

According to current specifications the UE counts the number of preamble transmissions it has done in a Random Access procedure. However, for example, in Dual Connectivity the UE may trigger (or attempt) a preamble transmission but would abort the actual transmission of the preamble because another preamble is being sent at the same time. In other words, the UE will have triggered (or attempted) a preamble transmission but the preamble transmission never actually occurred. If the UE never performs the preamble transmission, and hence never increased the counter, it would mean that the UE will take a longer time than expected before reaching the maximum number of preamble transmissions, preambleTransMax.

To illustrate this, consider the example where a UE is configured to perform two preamble transmissions. In case of a network-initiated Random Access procedure, the network orders the UE to perform a preamble transmission at, say, time T1. The UE then, at T1, does its first preamble transmission for this Random Access procedure. When this preamble transmission occurs, the UE increases the preamble transmission counter by one. However, due to poor radio conditions, for example, the preamble is not successfully decoded by the network, so the network does not respond to the terminal's preamble transmission with a Random Access Response. The UE, after realizing that no response to the preamble transmission has been received from the network, then triggers (or attempts) a second preamble transmission for the Random Access procedure at time T1+ ra-ResponseWindowSize. This second preamble transmission attempt may occur at a time where the preamble transmission would overlap (fully or partially) in time with another preamble transmission in another Random Access procedure in the UE. Due to this overlap, the preamble transmission is then aborted (or ignored, discarded, regarded as failed, etc.). Naturally, since the UE aborts the preamble transmission, the UE does not receive a Random Access Response this time, either. And since the UE has so far only performed one preamble transmission (which is less than the configured value of two), the UE then tries to send a preamble at time T1+ra-ResponseWindowSize+ra-ResponseWindowSize. Assume now that the preamble is finally received by the network and the network responds with a Random Access Response to the UE. The UE then proceeds and likely eventually completes both Random Access procedures.

The above example shows a scenario where the UE has performed two preamble transmissions but, since one transmission attempt was unsuccessful (due to time overlap with another preamble transmission), the UE has performed the two preamble transmissions with three attempts, at times T1, T1+ra-ResponseWindowSize, and T1+ra-ResponseWindowSize+ra-ResponseWindowSize. For the network, this may be undesirable or even unacceptable. The network expects the UE to send a preamble at time T1, and at time T1+ra-ResponseWindowSize, but not at time T1+ra-ResponseWindowSize+ra-ResponseWindowSize. Prior to the final transmission of the preamble, the network may even have assigned the same preamble to another UE, since it was expecting that the UE would only use the preamble two times.

In the above example, the value two has been used for the sake of readability of the example. In LTE, the parameter controlling the number of preamble transmissions ranges from 3 to 200, but the same principle demonstrated above applies for values higher than two.

It is herein used, as an example, that a preamble transmission is aborted, blocked, ignored, considered failed, etc., due to a collision with another preamble transmission. However, the techniques described herein could also be applied in the event that a preamble transmission is aborted, blocked, ignored, considered failed, etc., due to other reasons. For example, a feature allowing a UE to use LTE on un-licensed bands has been discussed. In these bands, the UE may need to use a "listen-before-talk" approach, meaning that the UE, before transmitting, must listen to the channel to determine whether the channel is busy or free to use. If the channel is considered to be free then the UE is allowed to transmit, while if the channel is considered to be busy the UE must abort the transmission. In this case, the UE may intend to send a preamble to the network but, due to the channel being considered busy, the UE may need to abort, block, ignore, consider failed, etc., the preamble transmission. The techniques described herein can be applied also to this scenario, among others.

According to a first approach for addressing the problems illustrated above, UE 12 is adapted (e.g., with appropriate program code executed by a processor) to count the number of triggers for (and/or attempts to and/or opportunities for) preamble transmissions. If this value exceeds a predetermined threshold the UE 12 will consider the Random Access procedure completed, and not perform more preamble transmission attempts in this Random Access procedure. Note that the predetermined threshold referred to here is different than the configured value for the maximum number of preamble transmissions that are allowed.

Further, when it is said here that the UE 12 triggers or attempts a preamble transmission, this includes all instances in which the UE 12 triggers or attempts to transmit a preamble at the physical layer, regardless of whether the preamble transmission is successfully performed, i.e. regardless of whether the preamble transmission is aborted, blocked, ignored, etc., before an actual transmission by the physical layer. For example, if the UE 12 is expected to send a preamble at a certain time and the UE 12 therefore triggers or attempts to perform a preamble transmission, but fails to actually transmit the preamble, e.g., due to that another preamble transmission was also triggered to be performed at the same time (either partially or fully overlapping in time), the UE 12 would consider that it has triggered or attempted the preamble transmission, and hence the UE 12 would increase the preamble transmission attempt counter.

For example, if the UE 12 triggers a preamble to be triggered at time T, the UE 12 increases the counter at time T, or shortly before or shortly after the time T, without regard to whether the preamble is actually transmitted. This preamble transmission attempt counter may be referred to as the PREMABLE_TRANSMISSION_ATTEMPT_COUNTER, for example, which is distinct from the currently specified PREAMBLE_TRANSMISSION_COUNTER. The latter counter tracks actual transmissions performed by the physical layer (regardless of the reception success or failure of the transmitted preamble).

When the PREAMBLE_TRANSMISSION_ATTEMPT_COUNTER counter value, which may be maintained in a MAC layer or MAC entity of the UE 12, for example, has reached a predetermined threshold value, the UE 12 will not send more preambles in this Random Access procedure. Note that the predetermined threshold value may be configured by the network (base station 10 or MME/SGW 6, 8 in some embodiments, e.g., by dedicated or broadcasted signaling sent to the UE 12. In some embodiments, an existing parameter in the LTE specifications, the preambleTransMax parameter specified in the MAC specifications found in the 3GPP document 3GPP TS 36.321, v12.3.0 (available at http://www.3gpp.org/dynareport/36321.htm), may be repurposed, so that it indicates the maximum number of preamble transmission attempts by the UE 12, rather than the maximum number of actual preamble transmissions.

In a variant of this approach, the UE 12 counts or otherwise keeps track of a specific interval of time during which a preamble can be used in a particular Random Access procedure. For example, if the UE 12 has been triggered (either by the network or due to a procedure in the UE 12 itself) to initiate a Random Access procedure and to trigger a preamble transmission at time T1, the UE 12 considers that it is allowed to use the preamble until T1 plus a predetermined preamble validity time. The preamble validity time could be calculated based on ra-ResponseWindowSize parameter. For example, if the UE 12 is allowed to send a preamble three times (i.e., preambleTransMax=3) the preamble validity time would be set to ra-ResponseWindowSize*3. The UE 12 then, after T1+preamble validity time, considers the Random Access procedure completed and does not send further preambles in this Random Access procedure. Note that an offset may be used when calculating the preamble validity time, in some embodiments. For example, the preamble validity time could be set to ra-ResponseWindowSize*3+ offset. The benefit of the offset is that the Random Access procedure may be triggered at a time T1, but the UE 12 will only be able to send the first preamble at time T1+offset.

In some embodiments, the physical layer in the UE 12 indicates to the MAC layer in the UE 12 whether a preamble transmission was aborted, ignored, unsuccessful due to collision with another preamble transmission, or if the preamble transmission was successfully executed. For example, when this indicator is received and indicates that the preamble transmission was unsuccessful, the MAC increments a PREAMBLE_TRANSMISSION_ATTEMPT_COUNTER by 1, but the MAC does not increment a separate PREAMBLE_TRANSMISSION_COUNTER by 1. Not incrementing the PREAMBLE_TRANSMISSION_COUNTER has the effect of not increasing the RACH transmission power, which is desirable, since the PRACH was unsuccessful due to collision, not due to insufficient transmission power.

It would be possible that the physical layer only sends an indication if the preamble transmission was aborted, ignored, or unsuccessful due to collision, but does not indicate when a preamble transmission is successfully executed. The MAC entity could then implicitly know that if the physical layer did not indicate that the transmission was aborted, ignore, or unsuccessful, then the preamble transmission was (implicitly) successful. The opposite could also be possible, i.e., that the physical layer only indicates that a preamble transmission was successful and if no such indication was received at the MAC entity, the MAC entity could implicitly know that the preamble transmission was unsuccessful.

In one example, when executing the command of preamble transmission from the MAC layer, the physical layer entity of the UE 12 may generate an indicator to send to the MAC entity of the UE 12, where the indicator indicates whether the preamble actually occurred as instructed. For example, the UE 12 may generate an indicator according to the following:

PREAMBLE_TRANSMISSION_INDICATOR=1, if the preamble transmission is carried out by the physical layer;

PREAMBLE_TRANSMISSION_INDICATOR=0, if the preamble transmission is aborted at the physical layer;

While two levels (represented by 1 bit) of PREAMBLE_TRANSMISSION_INDICATOR are described in the above, more levels (and more bits) in the PREAMBLE_TRANSMISSION_INDICATOR are possible. For example, a third level might be used, in some embodiments, to indicate that the preamble transmission is carried out by the physical layer, but with a reduced power level.

After receiving the PREAMBLE_TRANSMISSION_INDICATOR, the MAC entity can decide whether or not to increment the counter(s) maintained by the MAC entity. For example, the MAC entity may operate according to the following:

PREAMBLE_TRANSMISSION_COUNTER is incremented after receiving PREAMBLE_TRANSMISSION_INDICATOR=1 from the physical layer entity;

Otherwise, the PREAMBLE_TRANSMISSION_COUNTER is not incremented;

Note that in the above, PREAMBLE_TRANSMISSION_ATTEMPT_COUNTER is always incremented.

In addition to the counters, the MAC layer may adapt other behaviors in response to the physical layer indicator that the preamble transmission was aborted. For example, in some embodiments, the MAC layer and physical layer do not perform Random Access Response (RAR) reception in the event that the preamble transmission was aborted, since the UE 12 is aware that reception of the Random Access Response is impossible. Thus the UE 12 can go straight to the preparation of next preamble transmission, speeding up the Random Access procedure. In another example, if Random Access Preamble was selected by MAC, the MAC layer does not delay preamble transmission with backoff time; rather the MAC goes directly to the selection of Random Access Resource and preamble transmission. Note that this changes the normal MAC RA procedure, where the MAC layer normally selects a random back-off time, which delays the subsequent Random Access transmission by the backoff time.

Figure 15A:
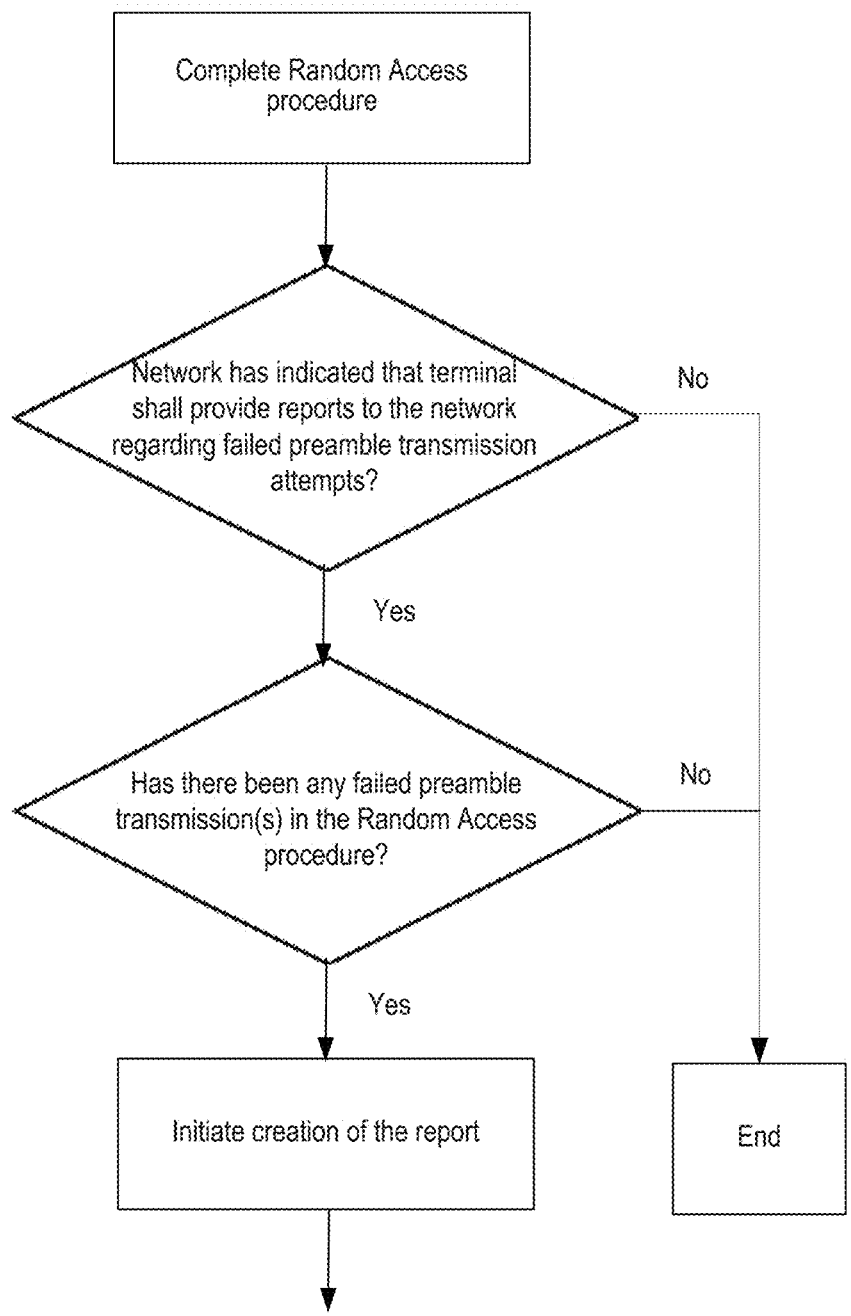
FIGS. 15A-15B are a flowchart illustrating a random access procedure, according to some embodiments.
Figure 15B:
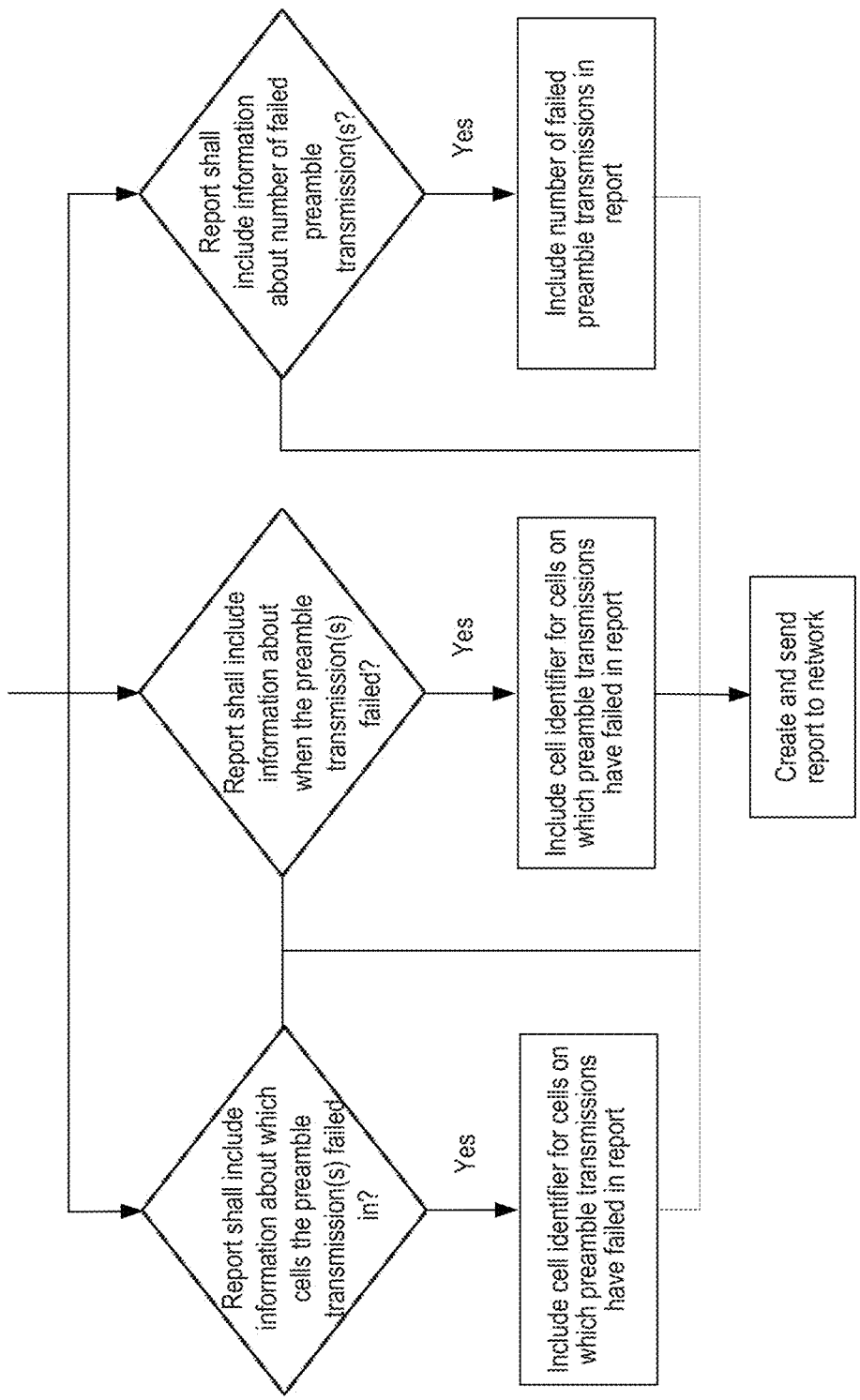

According to some embodiments, the UE 12 sends, from a physical layer control entity in the UE 12 to a MAC entity in the UE 12, an indication of whether each attempted preamble transmission was (i) completed or (ii) was aborted, ignored, or otherwise unsuccessfully completed by the physical layer control entity. The MAC entity may increment the preamble transmission attempt counter for every indication and increment the preamble transmission counter only for each indication that an attempted preamble transmission was completed by the physical layer control entity. As shown in FIGS. 15A-15B, each indication may include a selected one of at least three possible values: a first possible value corresponding to a successful preamble transmission at a target power level by the UE 12, a second possible value corresponding to an aborted, ignored, or otherwise unsuccessful preamble transmission attempt by the UE 12, and a third value corresponding to a preamble transmission completed by the UE 12 but at a power level lower than the target power level.

In some cases, the MAC entity increments the preamble transmission attempt counter for every preamble transmission failure indicator and increments both the preamble transmission attempt counter and the preamble transmission counter for each attempted preamble transmission that is not followed by a preamble transmission failure indicator. In other cases, the MAC entity increments both the preamble transmission attempt counter and the preamble transmission counter for every preamble transmission success indicator and increments only the preamble transmission attempt counter for each attempted preamble transmission that is not followed by a preamble transmission success indicator.

In another example, the UE 12 sends, from a physical layer control entity in the UE 12 to a MAC entity in the UE 12, a preamble transmission failure indicator for an attempted preamble transmission that is aborted. The physical layer control entity and the MAC entity then refrain from performing random access response reception in response to the report indicating that the attempted preamble transmission was aborted.

If the RACH procedure (or Random Access procedure) was PDCCH ordered by the network (but also for the case when the UE 12 initiated Random Access itself), the information about aborted or unsuccessful preamble transmissions may be useful for the network to know. Hence in some embodiments, the UE 12 will report this information to the network, such as to base station 10 or MME/SGW 6, 8.

The UE 12 may send this report to the base station 10 to which the Random Access procedure was done towards. For example, if the UE 12 performs a Random Access procedure towards the MeNB, the UE 12 may report to the MeNB on whether the preamble transmission(s) were successful or not. This indication could be sent in a MAC Control Element (CE). The network could use this information to adjust UE configurations, e.g., if the base station 10 has been informed that the UE 12 has failed to send a preamble due to collisions with other preamble transmissions, the base station 10 or MME/SGW 6, 8 may configure the UE 12 to try to send preambles additional times, to avoid that that Random Access procedures fail due to collisions.

A report may include an indication of whether or not the UE 12 has had aborted preamble transmissions. This could be a one-bit indication, where the indication would take one value (e.g., 1) if there has been an aborted preamble transmission, and another value (e.g., 0) if there have been no aborted preamble transmissions. Another possibility is that whether the report is sent or not is used as an indication. The UE 12 may be configured to send the report only if there has been aborted preamble transmissions, while if there has been no preamble transmissions the UE 12 would refrain from sending the report. The base station 10 could then implicitly know whether there have been aborted preamble transmissions based on whether the report has been received/not received from a UE 12.

The report/indication may include information regarding which Serving Cell the preamble abortion was done. This could be indicated as a bit-map, e.g., a 8-bit bitmap where the most significant bit corresponds to a Serving Cell with index 7 and the least significant bit corresponds to a Serving Cell with index 0. Alternatively, this information could be indicated as the index of the Serving Cell for which the preamble transmission was aborted, which could be indicated in binary form (e.g., 101 corresponds to cell index 5).

The report may include information of how many preamble transmissions in the Random Access procedure were aborted. The report may include an indication of which preamble the UE 12 was using when the aborting of the preamble transmission occurred. This may be indicated as a value (e.g., from 0-63) where each value corresponds to a preamble, for example. The report may also include information regarding on which cell the colliding preamble transmission was sent. The report may also include information about when the preamble transmission(s) aborted. The UE 12 may indicate when the preamble transmission was aborted.

The report may include information about what was the reason for the preamble transmission failure(s). As the UE 12 may fail preamble transmissions due to a collision(s) with other preamble(s) or due to that the channel/cell on which the preamble was meant to be sent on was considered busy by the UE 12. The UE 12 may therefore indicate to the base station 10 the reason for why the preamble transmission failed, was aborted, etc. This could, for example, be a one-bit indicator where the indicator takes one value (e.g., 0) if the reason for the preamble transmission failure was preamble collision, and another value (e.g., 1) if the reason for preamble transmission was busy channel.

Which content the report should include may be configured by the network. This is beneficial, since some base stations 10 may consider that they need more information than others. For example, two base stations 10 operating in a Dual Connectivity mode for a UE 12 may want to have information about when preamble transmissions have been aborted, to be able to coordinate with one another to avoid future collisions. In contrast, a base station 10 that is operating in an unlicensed spectrum may be interested only in whether preamble transmissions have been aborted, and perhaps how many.

The UE 12 may trigger sending of this report when a Random Access procedure has completed (e.g., either executed successfully, or aborted without being executed by the physical layer entity). Alternatively, the UE 12 may trigger sending of this report based on an indication from the network.

For example, if the base station 10 has ordered the UE 12 to perform a Random Access procedure but the base station 10 determines that the Random Access procedure was not successful, the base station 10 may request the UE 12 to send the report. That the base station 10 requests the report has the benefit that reports will not be sent unnecessarily, i.e., the UE 12 will not send reports in which the base station 10 is not interested.

The UE 12 may consider whether there has been any aborted preamble transmission attempts when evaluating whether to send the report or not. The UE 12 may be configured to only send such report in the event that there were aborted preamble transmission attempts.

In some embodiments, a UE 12 may conditionally apply one or more of the procedures provided herein. For example, the UE 12 may not always maintain a counter of preamble transmission attempts, but only selectively maintain such a counter. Whether the UE 12 applies one or more of the techniques described herein may be determined based on one or more conditions, in some embodiments.

Example conditions include when the UE 12 is operating in a Dual Connectivity mode. The embodiments provided herein may only be needed in case the UE 12 is operating in a Dual Connectivity mode. Another condition includes when the UE 12 is operating in a mode where it utilizes one or more carriers in an un-licensed band/spectrum. When the UE 12 is operating in one or more carriers in un-licensed bands, the UE 12 may attempt to send a preamble but may fail due to that the carrier being considered busy (e.g. by some other device in the system).

Another condition includes when the base station 10 has indicated that the UE 12 is to maintain a random access preamble transmission counter and terminate the random access procedure upon reaching a preamble transmission attempt threshold. This indication may be per carrier (or serving cell), e.g., the base station 10 or MME/SGW 6, 8 may have provided an index (or group of indices) of a carrier (or carriers) which the UE 12 shall maintain and react to a preamble transmission attempt counter. The indication may also be per UE 12, e.g., that the UE 12 shall use the preamble transmission attempt counter for all carriers/Serving Cells used by the UE 12.

A condition may also include when the UE 12 may consider its capability when deciding whether to use the preamble transmission attempt counter or not. For example, only some UEs may be capable of providing the report of successful/unsuccessful preamble transmissions to the base station 10 and hence UEs 12 that are not capable will not send such report.

FIGS. 15A and 15B combine to show an example implementation of some of the reporting mechanisms described above. For example, a report will be created and sent to the network if the network has indicated that the UE 12 is to provide reports regarding failed preamble transmission attempts. The report may include information about which cells, identified by respective cell identifiers, failed preamble transmission. This may include when the preamble transmission failed. The report may also include information about the number of failed transmission reports, including the actual number of failed preamble transmissions.

As an alternative to the MAC layer procedures discussed above, the PRACH handling of collision between parallel PRACHs can be handled via a physical layer procedure, without change to the MAC layer. The physical layer procedure in this alternative includes dropping of one of the colliding PRACHs, delaying of one of the colliding PRACHs, power adjustment of the delayed PRACH, etc.

In order not to increase PRACH transmission power unnecessarily, the physical layer can keep a counter of dropped (or aborted) PRACH transmission, NUM_ABORTED_PREAMBLE_TX, for each random access procedure. For each RA procedure, NUM_ABORTED_PREAMBLE_TX is initialized to 0 when the RA procedure starts. NUM_ABORTED_PREAMBLE_TX is incremented by 1 each time the preamble transmission is aborted at the physical layer.

The preamble transmission power PPRACH is then determined as PPRACH=min$\{P_{CMAX,c}(i)$, PREAMBLE_RECEIVED_TARGET_POWER+$PL_c$−NUM_ABORTED_PREAMBLE_TX×powerRampingStep$\}$_[dBm], where $P_{CMAX,c}(i)$ is the configured UE transmit power for subframe i of serving cell c and $PL_c$ is the downlink pathloss estimate calculated in the UE for serving cell c.

By defining NUM_ABORTED_PREAMBLE_TX to keep track of aborted preamble transmissions, the power level is handled without affecting MAC level counter PREAMBLE_TRANSMISSION_COUNTER, and without adding the new PREAMBLE_TRANSMISSION_ATTEMPT_COUNTER to the MAC entity. In other words, the aborted PRACH is handled completely by the physical layer without affecting MAC level procedure.

It will be appreciated that, using the techniques described above, the UE 12 only performs a limited number of preamble transmission attempts, regardless of whether the preamble transmission was successful (e.g., not blocked due to collision with another preamble transmission). Further, in some embodiments, the UE 12 only increases the preamble transmission power if the preamble transmission attempt was successful and is counted as a completed transmission that would increment the preamble transmission counter. These approaches may be used to ensure that the terminal is not sending more preambles than expected from the network, and to ensure that preamble transmission power is not higher than needed and/or expected by the network.

As discussed above, maintaining the preamble transmission attempt counter may be carried out by a physical layer control entity in the UE 12, in some embodiments, while in other embodiments the preamble transmission attempt counter is maintained by a MAC entity in the UE 12.

It should be understood that the methods 800, 900, 1000 and 1300 illustrated in FIGS. 8-10 and 13 are examples of the techniques described more fully above. Each of these methods may be modified according to any of the variations and details discussed. The methods illustrated in FIGS. 8-10 and 13, and variants thereof, may be implemented using the processing circuits illustrated in FIGS. 7, 12 and 14, as appropriate, where the processing circuits are configured, e.g., with appropriate program code stored in memory circuits 36, 46, and/or 56, to carry out the operations described above. While some of these embodiments are based on a programmed microprocessor or other programmed processing element, it will be appreciated that not all of the steps of these techniques are necessarily performed in a single microprocessor or even in a single module. Embodiments of the presently disclosed techniques further include computer program products for application in a wireless terminal as well as corresponding computer program products for application in a base station apparatus or other network node apparatus.

This program code or computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) running on a processor such as a digital signal processor, which may collectively be referred to as "circuitry," "a module" or variants thereof.

It will further be appreciated that various aspects of the above-described embodiments can be understood as being carried out by functional "modules," which may be program instructions executing on an appropriate processor circuit, hard-coded digital circuitry and/or analog circuitry, or appropriate combinations thereof.

Figure 16:
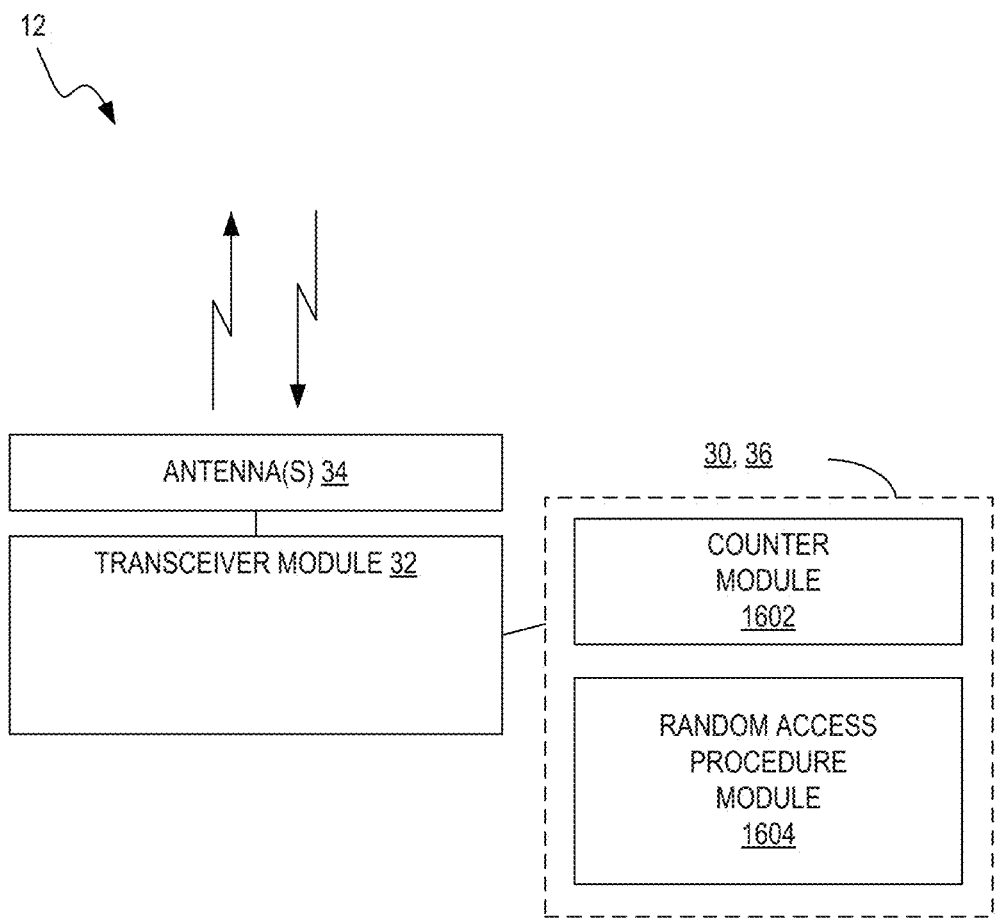
FIG. 16 is a block diagram of a functional implementation of a user equipment for performing a random access procedure, according to some embodiments.

For example, FIG. 16 illustrates an example functional module or circuit architecture as may be implemented in a UE 12, e.g., based on the processing module 30 and memory circuit 36. The illustrated embodiment at least functionally includes a counter module 1602 for maintaining a preamble transmission attempt counter that tracks the number of random access preamble transmissions that are triggered and/or initiated in a random access procedure, including random access preamble transmissions that are aborted prior to completion of the transmission. The implementation also includes a random access procedure module 1604 for terminating the random access procedure in response to determining that the preamble transmission attempt counter indicates that a predetermined threshold number of transmission attempts have been made.

Figure 17:
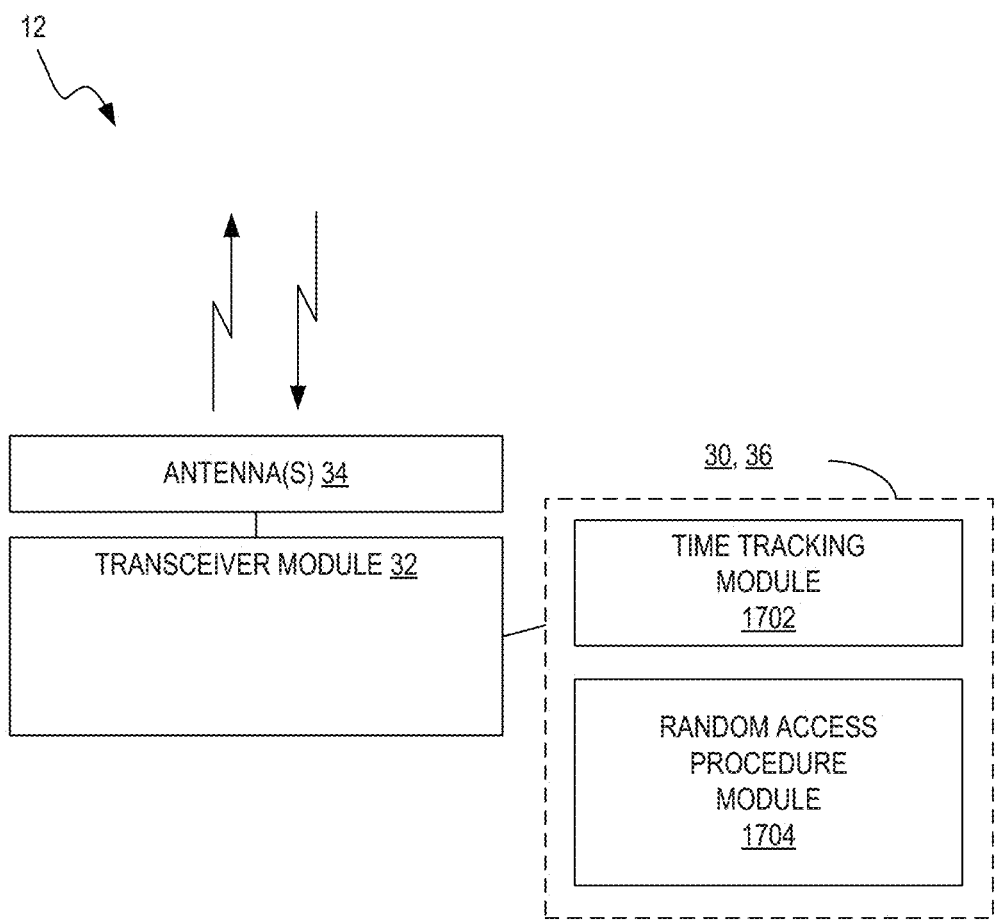
FIG. 17 is a block diagram of a functional implementation of a user equipment for performing a random access procedure, according to some embodiments.

FIG. 17 illustrates another example functional module or circuit architecture as may be implemented in a UE 12. This embodiment includes a time tracking module 1702 for tracking time during an interval in which a preamble may be used in the random access procedure. The implementation also includes a random access procedure module 1704 for terminating the random access procedure in response to determining that the interval during which the preamble may be used has expired.

Figure 18:
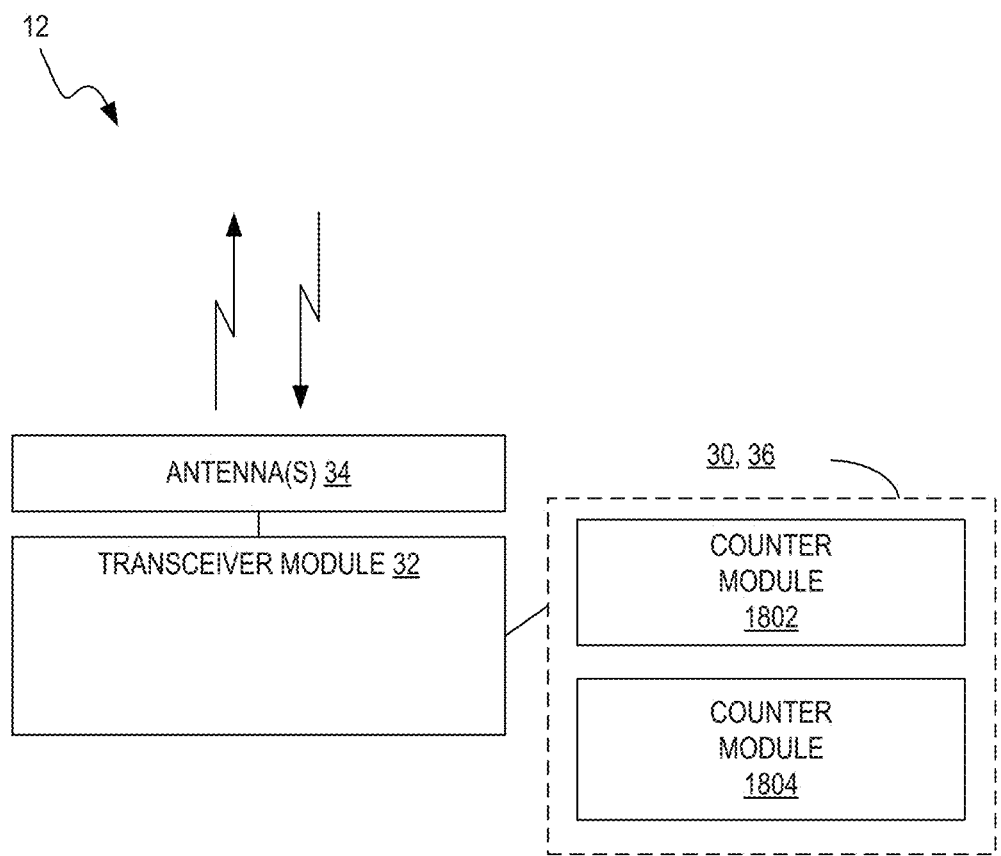
FIG. 18 is a block diagram of a functional implementation of a user equipment for performing a random access procedure, according to some embodiments.

FIG. 18 illustrates an example functional module or circuit architecture as may be implemented in a UE 12, e.g., based on the processing module 30 and memory circuit 36. The illustrated embodiment at least functionally includes a counter module 1802 for maintaining a preamble transmission attempt counter that tracks a number of random access preamble transmissions that are triggered at the physical layer in the random access procedure. The implementation also includes a counter module 1804 for maintaining a preamble transmission counter that tracks a timing of when to increment a power level of the random access preamble.

Figure 19:
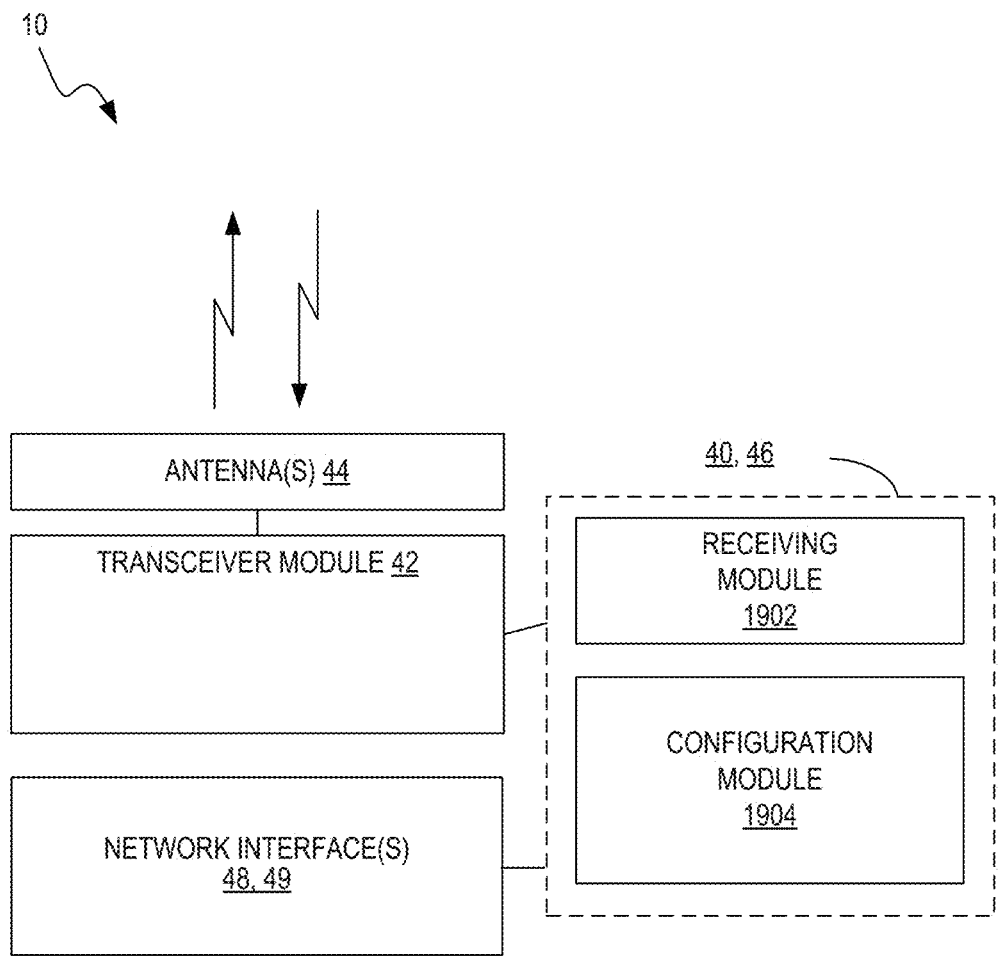
FIG. 19 is a block diagram of a functional implementation of a network node for receiving reports pertaining to a random access procedure, according to some embodiments.

FIG. 19 illustrates an example functional module or circuit architecture as may be implemented in a network node, such as a base station 10, e.g., based on the processing module 40 and memory circuit 46. The illustrated embodiment at least functionally includes a receiving module 1902 for receiving a report from a wireless terminal, the report indicating that at least one attempted preamble transmission for the random access procedure was not completed by the wireless terminal. The implementation also includes a configuration module 1904 for adjusting a configuration for the wireless terminal, based on the report.

Modifications and other variants of the described embodiment(s) will come to mind to one skilled in the art having the benefit of the teachings presented in the foregoing descriptions and the associated figures. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

What is claimed is:

1. A method in a wireless terminal, for performing a random access procedure in a wireless network, the method comprising:
   maintaining a preamble transmission attempt counter that tracks a number of random access preamble transmissions that are triggered and/or initiated in the random access procedure, including random access preamble transmissions that are aborted prior to completion of the transmission;
   terminating the random access procedure in response to determining that the preamble transmission attempt counter indicates that a predetermined threshold number of transmission attempts have been made.

2. The method of claim 1, wherein maintaining the preamble transmission attempt counter comprises incrementing the preamble transmission attempt counter for each attempted preamble transmission that is triggered and/or initiated in the random access procedure, without regard to whether the attempted preamble transmission is completed by the wireless terminal and without regard to whether a completed preamble transmission is received.

3. The method of claim 1, wherein the method further comprises maintaining a preamble transmission counter that tracks the number of random access preamble transmissions that are completed by the wireless terminal, but without regard to whether the random access preamble transmissions are successfully received.

4. The method of claim 3, wherein the method comprises calculating a power level for each random access preamble transmission attempt, based on the preamble transmission counter.

5. The method of claim 3, wherein the method further comprises sending, from a physical layer control entity in the wireless terminal to a Medium Access Control (MAC) entity in the wireless terminal, an indication of whether each attempted preamble transmission was (i) completed or (ii) was aborted, ignored, or otherwise unsuccessfully completed by the physical layer control entity; and wherein the MAC entity increments the preamble transmission attempt counter for every indication and increments the preamble transmission counter only for each indication that an attempted preamble transmission was completed by the physical layer control entity.

6. The method of claim 5, wherein each indication comprises a selected one of at least three possible values: a first possible value corresponding to a successful preamble transmission at a target power level by the wireless terminal, a second possible value corresponding to an aborted, ignored, or otherwise unsuccessful preamble transmission attempt by the wireless terminal, and a third value corresponding to a preamble transmission completed by the wireless terminal but at a power level lower than the target power level.

7. The method of claim 3, wherein the method further comprises sending, from a physical layer control entity in the wireless terminal to a Medium Access Control (MAC) entity in the wireless terminal, a preamble transmission failure indicator only for each attempted preamble transmission that is aborted, ignored, or otherwise unsuccessfully completed by the physical layer control entity; and wherein the MAC entity increments the preamble transmission attempt counter for every preamble transmission failure indicator and increments both the preamble transmission attempt counter and the preamble transmission counter for each attempted preamble transmission that is not followed by a preamble transmission failure indicator.

8. The method of claim 3, wherein the method further comprises sending, from a physical layer control entity in the wireless terminal to a Medium Access Control (MAC) entity in the wireless terminal, a preamble transmission success indicator only for each attempted preamble transmission that is successfully completed by the physical layer control entity; and wherein the MAC entity increments both the preamble transmission attempt counter and the preamble transmission counter for every preamble transmission success indicator and increments only the preamble transmission attempt counter for each attempted preamble transmission that is not followed by a preamble transmission success indicator.

9. The method of claim 3, wherein the method further comprises sending, from a physical layer control entity in the wireless terminal to a Medium Access Control (MAC) entity in the wireless terminal, a preamble transmission failure indicator for an attempted preamble transmission that is aborted; and wherein the physical layer control entity and the MAC entity further comprising refraining from performing random access response reception in response to a report indicating that the attempted preamble transmission was aborted.

10. The method of claim 3, wherein a Medium Access Control (MAC) entity in the wireless terminal refrains from delaying preamble transmission by a backoff time in response to random access preamble selection by the MAC entity.

11. The method of claim 1, wherein the method further comprises incrementing a power level for each random access preamble transmission attempt that follows a completed random access preamble transmission, while refraining from incrementing the power level for any attempted random access preamble transmission that follows an attempted random access preamble transmission that is aborted before being completed by the wireless terminal.

12. The method of claim 1, wherein the method further comprises incrementing a power level for each random access preamble transmission attempt that follows a completed random access preamble transmission that is not determined by the wireless terminal to have been successfully received, while refraining from incrementing the power level for any attempted random access preamble transmission that follows an attempted random access preamble transmission that is aborted before being completed by the wireless terminal.

13. The method of claim 1, wherein the random access procedure is one of two or more random access procedures at least partially overlapping in time, and wherein maintaining the preamble transmission attempt counter comprises incrementing the preamble transmission attempt counter for at least one attempted preamble transmission that is aborted because of a collision with an attempted preamble transmission for another one of the random access procedures.

14. The method of claim 1, wherein maintaining the preamble transmission attempt counter is carried out by a physical layer control entity in the wireless terminal.

15. The method of claim 1, wherein maintaining the preamble transmission attempt counter is carried out by a Medium Access Control (MAC) entity in the wireless terminal.

16. A method in a wireless terminal, for performing a random access procedure in a wireless network, the method comprising:
    updating a preamble transmission attempt counter to track a number of random access preamble transmissions that are triggered at the physical layer in the random access procedure; and
    updating a preamble transmission counter to track a timing of when to increment a power level of the random access preamble.

17. The method of claim 16, wherein the method comprises, for a first preamble transmission, incrementing both the preamble transmission attempt counter and the preamble transmission counter.

18. The method of claim 16, wherein the method comprises, for a first preamble transmission, incrementing the preamble transmission attempt counter but not incrementing the preamble transmission counter.

19. A wireless terminal apparatus comprising a radio transceiver configured to communicate with a wireless network and further comprising one or more processing circuits configured to:
    maintain a preamble transmission attempt counter that tracks a number of random access preamble transmissions that are triggered and/or initiated in the random access procedure, including random access preamble transmissions that are aborted prior to completion of the transmission;
    terminate the random access procedure in response to determining that the preamble transmission attempt counter indicates that a predetermined threshold number of transmission attempts have been made.

20. A wireless terminal apparatus comprising a radio transceiver configured to communicate with a wireless network and further comprising one or more processing circuits configured to:
    update a preamble transmission attempt counter to track a number of random access preamble transmissions that are triggered at the physical layer in the random access procedure; and
    update a preamble transmission counter to track a timing of when to increment a power level of the random access preamble.

* * * * *